(12) United States Patent
DeRossett

(10) Patent No.: US 12,222,116 B2
(45) Date of Patent: Feb. 11, 2025

(54) ADJUSTABLE MOUNTING ASSEMBLY FOR AIR CONDITIONING OUTDOOR UNIT

(71) Applicant: Midea Group Co., Ltd., Foshan (CN)

(72) Inventor: Andrew DeRossett, Shelbyville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 0 days.

(21) Appl. No.: 17/566,438

(22) Filed: Dec. 30, 2021

(65) Prior Publication Data

US 2023/0213218 A1 Jul. 6, 2023

(51) Int. Cl.
*F24F 1/62* (2011.01)
*F16M 11/04* (2006.01)
*F24F 13/32* (2006.01)

(52) U.S. Cl.
CPC ............ *F24F 1/62* (2013.01); *F16M 11/046* (2013.01); *F24F 13/32* (2013.01)

(58) Field of Classification Search
CPC ...... F24F 1/60; F24F 1/62; F24F 1/027; F24F 1/031; F24F 13/32; F24F 2221/20; F16M 11/045; F16M 11/046
USPC ............ 248/208, 328, 329, 330.1, 331, 332; 62/262, 263
See application file for complete search history.

(56) References Cited

U.S. PATENT DOCUMENTS

| | | | |
|---|---|---|---|
| 2,320,436 A | 6/1943 | Hull | |
| 2,433,104 A | 12/1947 | Eberhart | |
| 3,296,820 A | 1/1967 | Bauman | |
| 3,309,889 A | 3/1967 | Copp | |
| 3,372,557 A | 3/1968 | Dyas et al. | |
| 3,394,910 A | 7/1968 | Ulich | |
| 3,415,074 A | 12/1968 | Metcalfe | |

(Continued)

FOREIGN PATENT DOCUMENTS

| | | |
|---|---|---|
| CN | 2560895 Y | 7/2003 |
| CN | 101876466 A | 11/2010 |

(Continued)

OTHER PUBLICATIONS

Alpine Hardware, Universal Window Air Conditioner Bracket—Heavy-Duty Window AC Support—Support Air Conditioner Up to 180 lbs.—For 12000 BTU AC to 24000 BTU AC Units (Heavy Duty), Retrieved from: https://alpinehardware.com/collections/ac-brackets/products/universal-window-air-conditioner-bracket-heavy-duty-window-ac-support-support-air-conditioner-up-to-180-lbs-for-12000-btu-ac-to-24000-btu-ac-units-heavy-duty, Retrieved on: Apr. 27, 2022.

(Continued)

*Primary Examiner* — Jonathan Liu
*Assistant Examiner* — Guang H Guan
(74) *Attorney, Agent, or Firm* — Gray Ice Higdon

(57) ABSTRACT

An adjustable mounting assembly for an outdoor unit of an air conditioning unit is disclosed. In some embodiments, the outdoor unit on the adjustable mounting assembly may be capable of moving among multiple height positions, for example, from a higher loading position to a lower installed position. For example, in some embodiments, the adjustable mounting assembly may include a counterbalancing mechanism to facilitate the position movement of the outdoor unit. In some other embodiments, the position movement of the outdoor unit may be achieved by folding and/or unfolding of a scissor lifting mechanism.

18 Claims, 14 Drawing Sheets

(56) References Cited

U.S. PATENT DOCUMENTS

| | | | |
|---|---|---|---|
| 3,491,549 A | 1/1970 | Oglesby | |
| 3,554,476 A | 1/1971 | Gaylor | |
| 3,576,114 A | 4/1971 | Sharp et al. | |
| 4,079,813 A * | 3/1978 | Ellison | A47L 3/02 182/62 |
| 4,729,540 A | 3/1988 | Rozema | |
| 5,027,614 A * | 7/1991 | Mori | F24F 13/32 62/262 |
| 5,035,116 A | 7/1991 | Main | |
| 5,167,131 A | 12/1992 | Karkhanis | |
| 5,191,770 A | 3/1993 | Kim | |
| 5,582,025 A | 12/1996 | Dubin et al. | |
| 5,823,289 A * | 10/1998 | Csomos | A47L 3/02 182/62 |
| 6,481,228 B1 | 11/2002 | Chiang | |
| 6,568,201 B1 | 5/2003 | Cur et al. | |
| 6,767,278 B1 | 7/2004 | Peterson | |
| 7,296,424 B2 | 11/2007 | Thompson | |
| 7,383,923 B2 | 6/2008 | Patten et al. | |
| 8,167,260 B2 * | 5/2012 | Boccia | F24F 13/32 248/209 |
| 8,533,955 B2 | 9/2013 | Agnihotri | |
| 8,584,998 B1 * | 11/2013 | Peterson | F24F 13/32 182/62 |
| 8,925,176 B2 | 1/2015 | Choi et al. | |
| 9,163,854 B2 * | 10/2015 | Arbucci | E04B 1/388 |
| 9,222,684 B2 | 12/2015 | Cho et al. | |
| 9,303,895 B1 * | 4/2016 | Grant | F24F 13/32 |
| 9,447,916 B2 | 9/2016 | Darby | |
| D782,289 S | 3/2017 | Darby | |
| 9,915,394 B2 * | 3/2018 | Chen | F16M 11/28 |
| 9,938,044 B2 * | 4/2018 | Gamboa | B65D 85/68 |
| 10,203,130 B2 * | 2/2019 | Gardikis, Sr. | F24F 1/027 |
| 10,295,221 B2 * | 5/2019 | Zhang | F16M 13/02 |
| 10,401,043 B2 | 9/2019 | Li | |
| D884,461 S * | 5/2020 | Allen | D8/349 |
| 10,739,018 B2 | 8/2020 | Baumann et al. | |
| 10,760,795 B2 | 9/2020 | Booten et al. | |
| 10,775,054 B2 | 9/2020 | Bradford et al. | |
| 10,907,810 B1 | 2/2021 | Moghal et al. | |
| 11,125,479 B1 | 9/2021 | Ingram | |
| 11,168,920 B1 * | 11/2021 | Leezer | F24F 1/027 |
| 11,339,993 B2 * | 5/2022 | Zhao | F24F 13/32 |
| 11,384,945 B2 | 7/2022 | Aryeh | |
| 11,397,023 B2 | 7/2022 | Xing et al. | |
| 11,397,024 B2 * | 7/2022 | Xing | F24F 1/0003 |
| 11,411,527 B2 * | 8/2022 | Simon | E06B 7/28 |
| 11,415,329 B2 | 8/2022 | Liu et al. | |
| 11,441,791 B2 | 9/2022 | Lei et al. | |
| 11,441,792 B2 | 9/2022 | Liang et al. | |
| 11,498,163 B2 * | 11/2022 | Li | F24F 1/0003 |
| 11,536,469 B2 | 12/2022 | Si et al. | |
| 11,566,815 B2 * | 1/2023 | Martinez Galvan | F24F 13/32 |
| 11,619,241 B2 | 4/2023 | Servies | |
| 11,835,172 B2 | 12/2023 | Dunn | |
| 2009/0031744 A1 | 2/2009 | D'Souza | |
| 2009/0107162 A1 | 4/2009 | Su et al. | |
| 2009/0188174 A1 | 7/2009 | Schreiber | |
| 2015/0192309 A1 | 7/2015 | Frolov | |
| 2016/0131404 A1 | 5/2016 | Mochizuki et al. | |
| 2017/0284683 A1 | 10/2017 | Gallo | |
| 2019/0056143 A1 | 2/2019 | Zhang | |
| 2019/0063760 A1 | 2/2019 | Li | |
| 2019/0301668 A1 | 10/2019 | Mai | |
| 2020/0124296 A1 | 4/2020 | Baumann | |
| 2020/0217521 A1 | 7/2020 | Lundstrom | |
| 2020/0370764 A1 | 11/2020 | Strickland | |
| 2021/0010688 A1 | 1/2021 | Biasotti et al. | |
| 2021/0078118 A1 | 3/2021 | Li et al. | |
| 2021/0088251 A1 | 3/2021 | Galvan et al. | |
| 2021/0164667 A1 | 6/2021 | Yu et al. | |
| 2021/0180828 A1 | 6/2021 | Xing | |
| 2021/0381700 A1 | 12/2021 | Aryeh | |
| 2022/0056715 A1 | 2/2022 | O'Mara | |
| 2023/0026722 A1 * | 1/2023 | Yu | F24F 13/32 |
| 2023/0126498 A1 | 4/2023 | Li | |
| 2023/0213214 A1 * | 7/2023 | Leezer | F24F 1/027 62/262 |
| 2023/0213215 A1 * | 7/2023 | DeRossett | F24F 13/32 62/262 |
| 2023/0213218 A1 * | 7/2023 | DeRossett | F16M 11/046 248/669 |
| 2023/0280048 A1 | 9/2023 | Gray et al. | |
| 2023/0375222 A1 | 11/2023 | Leezer | |
| 2024/0200825 A1 | 6/2024 | Gray | |

FOREIGN PATENT DOCUMENTS

| | | | | |
|---|---|---|---|---|
| CN | 101876468 A | 11/2010 | | |
| CN | 103299756 A | 9/2013 | | |
| CN | 101876467 B | 7/2014 | | |
| CN | 108679746 A | 10/2018 | | |
| CN | 108931005 A | 12/2018 | | |
| CN | 109163388 A | 1/2019 | | |
| CN | 110657501 A | 1/2020 | | |
| CN | 210320347 U | 4/2020 | | |
| CN | 210399219 U | 4/2020 | | |
| CN | 111219801 A | * | 6/2020 | F24F 1/62 |
| CN | 110657487 B | 8/2021 | | |
| CN | 113465050 A | * | 10/2021 | F24F 1/32 |
| KR | 20210080821 A | 7/2021 | | |
| WO | WO2018133140 A1 | 7/2018 | | |
| WO | WO2018133156 A1 | 7/2018 | | |
| WO | 2020224096 A1 | 11/2020 | | |
| WO | WO2020220828 A1 | 11/2020 | | |
| WO | WO2020220830 A1 | 11/2020 | | |
| WO | WO2020224328 A1 | 11/2020 | | |
| WO | WO2020228409 A1 | 11/2020 | | |
| WO | WO2021050726 A1 | 3/2021 | | |

OTHER PUBLICATIONS

Transmittal of Related Applications dated Jul. 20, 2022.
Top Shelf A/C Corporation; Top Shelf TSB-2438 Air Conditioner Bracket; retrieved from https://www.amazon.com/TOP-SHELF-TSB-2438-Conditioner-Bracket/dp/B00NKQFSH6; Amazon; dated 2022.
Dec. 30, 2021, U.S. Appl. No. 17/566,416.
Jun. 17, 2022, U.S. Appl. No. 17/843,176.
ForestAir, The MINI Series, Retrieved from: https://www.forestair.ca/en/serie-mini-anglais , Retrieved on Oct. 27, 2021.
Appliances Connection, How to Install Friedrich Breeze through the Window, Friedrich, Retrieved from: https://www.youtube.com/watch?v=cwK2-4PaVt8 , May 9, 2013.
Electrical Know How, Electrical Wiring Diagrams for Air Conditioning Systems—Part Two, Retrieved from:http://www.electrical-knowhow.com/2014/05/electrical-wiring-diagrams-for-air-conditioning.html; Retrieved on Jul. 13, 2021.
Bright Hub Engineering, Parts of Split Air Conditioners: Outdoor Unit, Retrieved from:https://www.brighthubengineering.com/hvac/45044-parts-of-the-split-air-condioners-outdoor-unit/, Aug. 8, 2009.
Transmittal of Related Applications dated Jan. 4, 2022.
Trpisovsky, Joseph F., United States Patent and Trademark Office, Non-Final Office Action issued in U.S. Appl. No. 17/685,336, 52 pages, dated Apr. 1, 2024.
Trpisovsky, Joseph F., United States Patent and Trademark Office, Non-Final Office Action issued in U.S. Appl. No. 17/566,416, 66 pages, dated Feb. 28, 2024.
Trpisovsky, Joseph F., United States Patent and Trademark Office, Third Party Art Submission issued in U.S. Appl. No. 17/685,336, 35 pages, dated Mar. 4, 2024.
Guan, Guang H., United States Patent and Trademark Office, Non-Final Office Action issued in U.S. Appl. No. 17/843,176, 81 pages, dated Jan. 22, 2024.
McNichols, Eret C., United States Patent and Trademark Office, Non-Final Office Action issued in U.S. Appl. No. 18/067,005, 90 pages, dated May 22, 2024.

(56) References Cited

OTHER PUBLICATIONS

Guan, Guang H., United States Patent and Trademark Office, Final Office Action issued in U.S. Appl. No. 17/843,176, 54 pages, dated Aug. 14, 2024.

Trpisovsky, Joseph F., United States Patent and Trademark Office, Notice of Allowance issued in U.S. Appl. No. 17/566,416, 28 pages, dated Aug. 5, 2024.

McNichols, Eret C., United States Patent and Trademark Office, Notice of Allowance issued in U.S. Appl. No. 18/067,005, 72 pages, dated Oct. 16, 2024.

Trpisovsky, Joseph F., United States Patent and Trademark Office, Notice of Allowance issued in U.S. Appl. No. 17/685,336, 43 pages, dated Oct. 23, 2024.

Trpisovsky, Joseph F., United States Patent and Trademark Office, Notice of Allowance issued in U.S. Appl. No. 17/566,416, 28 pages, dated Nov. 22, 2024.

\* cited by examiner

ADJUSTABLE MOUNTING ASSEMBLY FOR AIR CONDITIONING OUTDOOR UNIT

BACKGROUND

Air conditioning units are typically classified into split type air conditioning units and integral type air conditioning units. The split type air conditioning unit usually includes an indoor unit and an outdoor unit. The indoor unit is installed indoors, and draws indoor air into the unit to allow the drawn air to exchange heat with refrigerant, and discharges the heat-exchanged air to the conditioned indoor space. The outdoor unit allows the refrigerant introduced from the indoor unit to exchange heat with outdoor air such that the refrigerant is in a state available for heat exchange with indoor air, and then provides the refrigerant to the indoor unit. The indoor unit and the outdoor unit are usually connected to each other by a refrigerant pipe through which refrigerant flows. By contrast, the integral type of air conditioning unit (e.g., a window air conditioning unit) usually includes all the unit components, such as electrical panels, heat exchangers (e.g., evaporators, condensers), compressors, and fans, encased in a housing as a single packaged unit.

One of the advantages of the integral type air conditioning unit is that it is easy to install and thus allows consumers to install the unit themselves if they prefer. However, the integral type air conditioning unit, such as a window-mounted air conditioning unit, is often of relatively low efficiency because of the size limitations of the window-mounted packaged housing. In addition, the integral type air conditioning units generally do not come with heat pumps and therefore are suitable only for summer use. Also, as most integral type air conditioning units are mounted in a window, sunlight is blocked, the window view cannot be enjoyed, and the window cannot be opened or closed freely. Moreover, the traditional integral type air conditioning units tend to be very noisy in operation, as the noise generated by the compressor and the condenser of the air conditioning unit easily travels into the room.

The split type air conditioning unit may overcome the disadvantages of the integral type air conditioning unit as described above, with the outdoor unit being installed outside of the room. However, one of the disadvantages of the split type air conditioning unit is that it is usually more expensive for installation compared with the integral type air conditioning unit, especially regarding the installation of the outdoor unit of the split type air conditioning unit. For example, the conventional mounting apparatus/assembly supporting the outdoor unit at a window is usually undesirable because the mounting assembly along with the outdoor unit effectively blocks all or a portion of the window even when the air conditioning unit is not in use. Moreover, the conventional mounting assembly for the outdoor unit usually has a fixed mounting position and do not allow for easy adjustments or adjustments at all to fit different mounting needs. Consequently, the consumers may experience inconvenience during installation and operation of the air conditioning unit.

Accordingly, a need continues to exist in the art for a convertible/adjustable apparatus/method that allows easy and rapid installation and position adjustment of the outdoor unit of the split or hybrid type air conditioning unit to satisfy different application requirements of the consumers.

SUMMARY

The present disclosure relates to an adjustable mounting assembly for an outdoor unit of an air conditioning unit, and in particular to an height-adjustable mounting assembly for selective dispositions of the outdoor unit fully outwardly of a window of an air-conditioned space. The adjustable mounting assembly may be configured to dispose the outdoor unit in an installed position with all or at least a major portion thereof not in visible blocking alignment, or disposed in a nonblocking disposition relative to the window for a full window view. In some embodiments, the outdoor unit may be capable of moving between among multiple height positions, for example, from a higher loading position to a lower installed position. The height of the outdoor unit may be adjusted by various converting/lifting mechanisms. For example, in some embodiments, the adjustable mounting assembly may include a counterbalancing mechanism to facilitate the height adjustment of the outdoor unit. In some other embodiments, the height adjustment may be achieved by folding and/or unfolding of a scissor lifting mechanism.

Another related object of the disclosure is to provide such an adjustable mounting assembly that permits the window to be substantially fully open/closed. Yet another object is to provide such an adjustable mounting assembly that is relatively inexpensive and practicable for self-installation, and well-suited for different window configurations/dimensions. Other objects and advantages of the disclosed apparatus will become apparent from the specification and appended claims and from the accompanying drawing illustrative of the invention.

In some embodiments, this and other objects are accomplished by an adjustable mounting assembly, comprising a frame having a vertical guide track with a first track end and a second track end, and a sliding element slidable within the vertical guide track between a first position at the first track end and a second position at the second track end. The outdoor unit may be supported by the sliding element, and the height of the outdoor unit may be adjustable through a sliding movement of the sliding element within the vertical guide track between the first track end and the second track end.

In some embodiments, an adjustable mounting assembly for an outdoor unit of an air conditioning unit may include a frame having a plurality of vertical guide tracks, a plurality of sliding elements vertically slidable within the plurality of vertical guide tracks and a first platform supported by the plurality of sliding elements within the plurality of vertical guide tracks. Each of the plurality of vertical guide tracks may have a first track end and a second track end, and the plurality of sliding elements may be vertically slidable within the plurality of vertical guide tracks between the first track end and the second track end. The first platform holding the outdoor unit may be moveable through a sliding movement of the plurality of sliding elements within the plurality of vertical guide tracks between the first track end and the second track end.

In some other embodiments, an adjustable mounting assembly for an outdoor unit of an air conditioning unit may include a top horizontal guide bracket having a top horizontal guide track, a bottom horizontal guide bracket positioned parallel to the top horizontal guide bracket and having a bottom horizontal guide track, a scissor lifting mechanism comprising a plurality of pivoted scissor rods arranged between the top horizontal guide bracket and the bottom horizontal guide bracket, a platform supported by the scissor lifting mechanism, a horizontal connection rail coupled to the platform, a window support rail coupled to the horizontal connection rail and having a first window rail support end and a second window support rail end, and a wall support leg coupled to the horizontal connection rail and having a wall support foot. The scissor lifting mechanism may have a top end section slidably coupled within the top horizontal guide track and a bottom end section slidably coupled within the bottom horizontal guide track, and a height of the platform holding the outdoor unit may be adjustable through a sliding movement of the scissor lifting mechanism within the top horizontal guide track and the bottom horizontal guide track. The first window support rail end and the second window support rail end may be configured to abut an inside jamb surrounding a window, and the wall support foot may be configured to abut a structure surface below the window.

In some other embodiments, an adjustable mounting assembly for an outdoor unit of an air conditioning unit may include a top horizontal guide bracket having a top horizontal guide track, a bottom horizontal guide bracket positioned parallel to the top horizontal guide bracket and having a bottom horizontal guide track, a scissor lifting mechanism comprising a plurality of pivoted scissor rods arranged between the top horizontal guide bracket and the bottom horizontal guide bracket, a platform supported by the scissor lifting mechanism, a horizontal connection rail coupled to the platform, and a window support rail coupled to the horizontal connection rail and having a first window rail support end and a second window support rail end. The scissor lifting mechanism may have a top end section slidably coupled within the top horizontal guide track and a bottom end section slidably coupled within the bottom horizontal guide track, and a height of the platform holding the outdoor unit may be adjustable through a sliding movement of the scissor lifting mechanism within the top horizontal guide track and the bottom horizontal guide track. The first window support rail end and the second window support rail end may be configured to abut an inside jamb surrounding a window.

In some other embodiments, an adjustable mounting assembly for an air conditioning outdoor unit may include a scissor lifting mechanism, a platform supported by the scissor lifting mechanism, a horizontal connection rail coupled to the platform, a window support rail coupled to the horizontal connection rail, and a wall support leg coupled to the horizontal connection rail. The platform holding said outdoor unit may be movable through folding and/or unfolding of the scissor lifting, the window support rail may be configured to abut an inside jamb surrounding a window, and the wall support leg may be configured to abut a structure surface below the window.

A method of installing an outdoor unit of an air conditioning unit using an adjustable mounting assembly is disclosed. The adjustable mounting assembly may have a first platform movable between a first, loading position and a second, installed position. The method may include positioning the outdoor unit on the first platform and operating the mounting assembly to move the first platform holding the outdoor unit from the first, loading position to the second, installed position as desired by the user.

These and other advantages and features, which characterize the invention, are set forth in the claims annexed hereto. For a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

The embodiments discussed hereinafter are directed in part to an adjustable mounting assembly for mounting an outdoor unit of an air conditioning unit, for example, at a window, and a method therefor that utilizes the disclosed mounting assembly for outdoor unit mounting/installation. The functionality of the disclosed apparatus is a significant improvement over known designs. The apparatus described herein not only provides an easy solution to install the air conditioning outdoor unit, but also enables a potentially easy manner of adjusting the outdoor unit positions. The embodiments shown and described include various converting/lifting mechanisms that provide flexibility of the disposition of the outdoor unit. As will be shown and described below, the adjustable mounting assembly may be equipped with various lifting mechanisms, such as a counterbalance mechanism or a scissor lifting mechanism, for moving the outdoor unit positions from a loading position to an installed position. Applications in which such adjustable mounting assembly are of importance may include, but not be limited to, the installation of an outdoor unit of a conventional split type air conditioning unit or a hybrid window air conditioning unit. Additionally, such mounting assembly may be employed in various other applications (e.g., an adjustable assembly for holding items other than air conditioning outdoor units). In general, the disclosed apparatus is convenient to use, provides secured installations, and permits easy adjustments of the apparatus itself and movements of the outdoor unit positions thereon.

Figure 1:
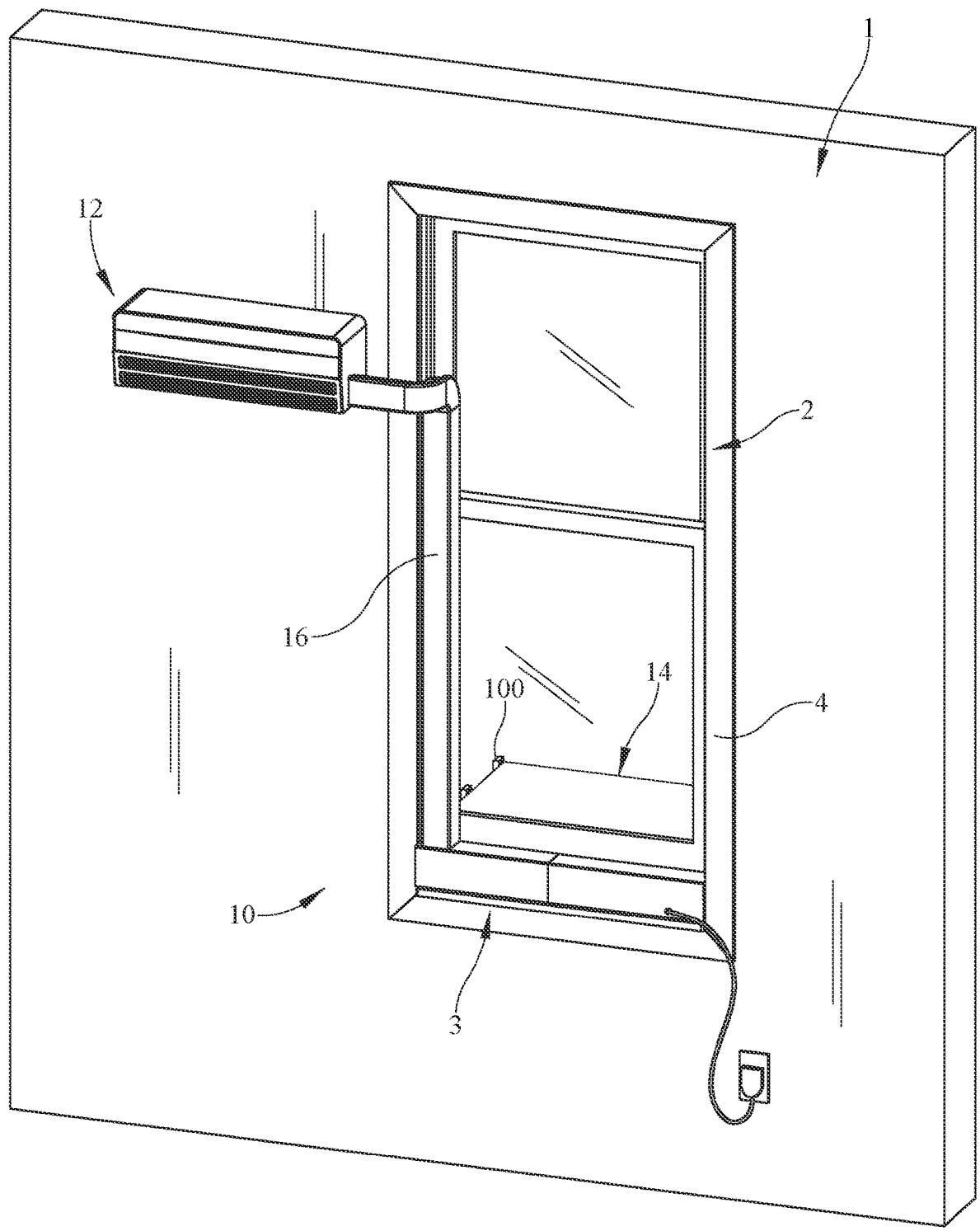
FIG. 1 is an indoor perspective view of a hybrid air conditioning unit installed with an adjustable mounting assembly mounted at a window, according to one embodiment.
Figure 2:
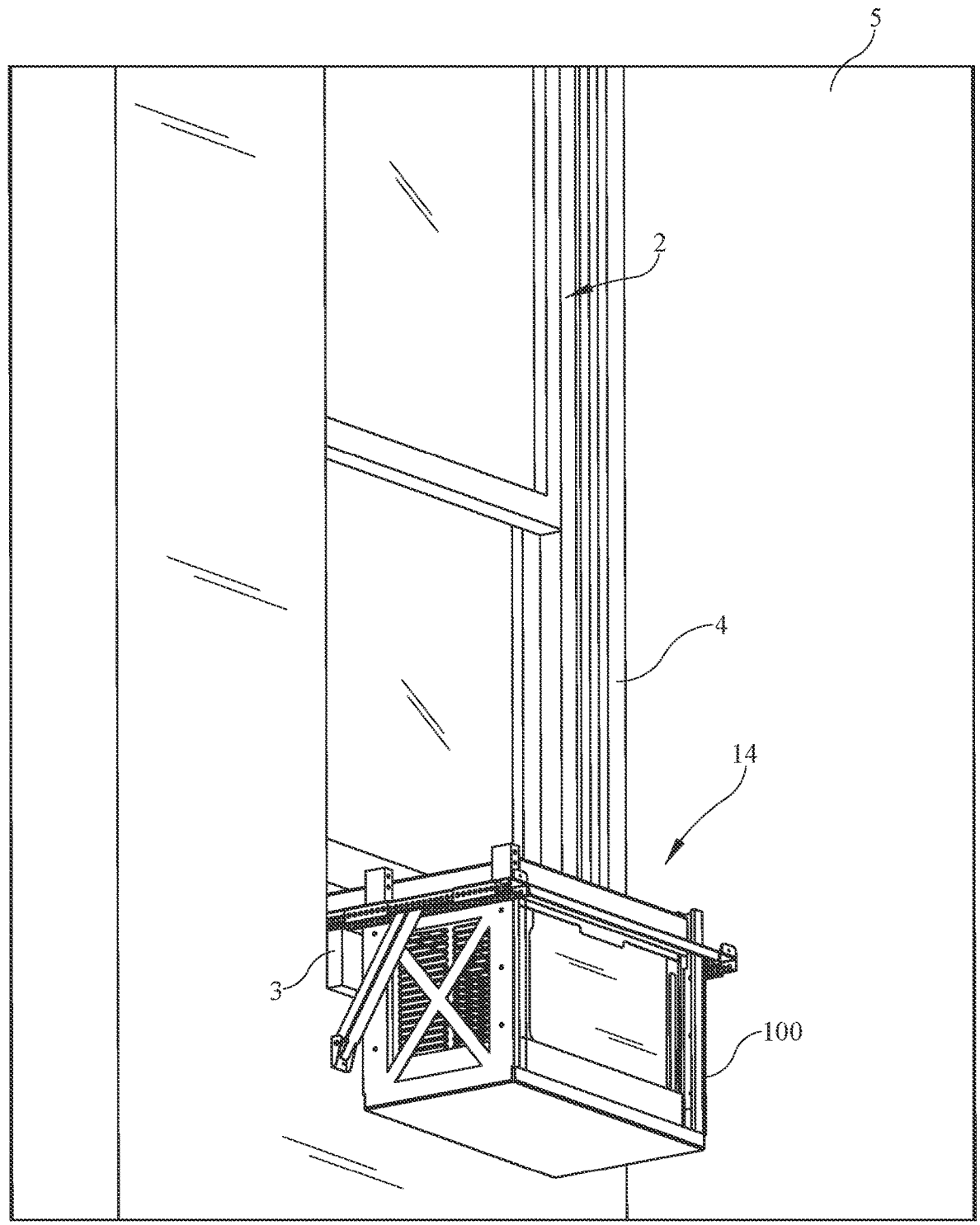
FIG. 2 is an outdoor lower perspective view of an outdoor unit of the hybrid air conditioning unit of FIG. 1 installed on an adjustable mounting assembly in an installed configuration, according to one embodiment.
Figure 3:
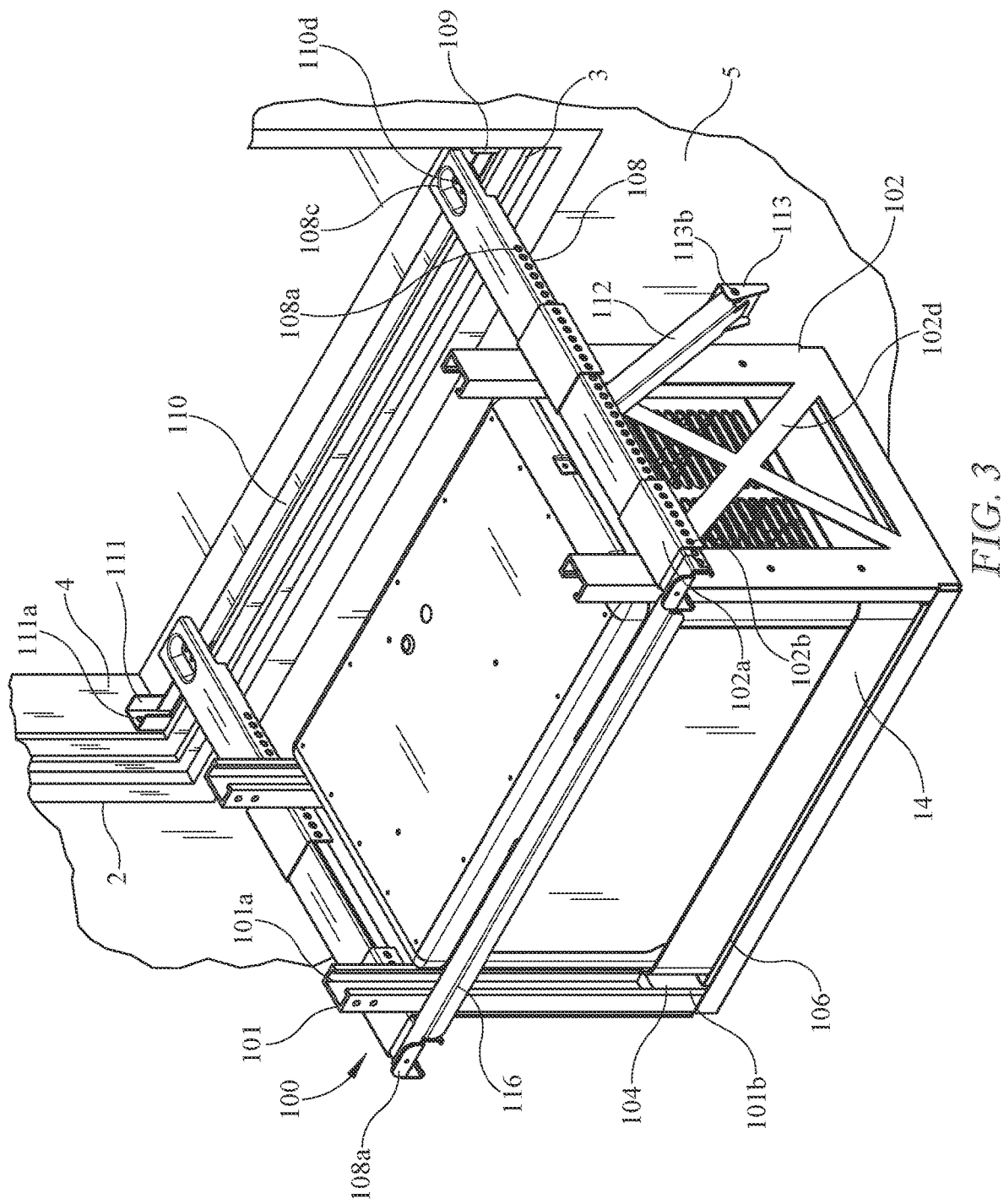
FIG. 3 is an enlarged outdoor upper perspective view of the outdoor unit of the hybrid air conditioning unit of FIG. 1 installed on an adjustable mounting assembly in an installed configuration, according to one embodiment.

It is to be understood that an adjustable mounting assembly is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. Turning now to the drawings, wherein like numbers denote like parts throughout the several views, FIGS. 1-2 illustrate a generalized perspective view to show the overall configuration of a split/hybrid type window air conditioning unit 10. Referring to FIGS. 1-2, the air conditioning unit 10 may include an indoor unit 12, an outdoor unit 14, and a connection unit 16 containing the piping/wiring between the indoor unit 12 and the outdoor unit 14. The air conditioning unit 10 may be applied for different room/window configurations. For example, FIG. 1 is an indoor perspective view illustrating the configuration of the air conditioning unit 10 installed in a room with a vertical sliding window 2. In some other embodiments not shown here, the air conditioning unit 10 may also be installed in a room with a side sliding window. In some embodiments, the indoor unit 12 may be mounted generally at any height on an interior wall 1, but preferably is mounted within approximately one to approximately four feet from the top of an interior wall 1 to improve the airflow distribution and sound performance. As the outdoor heat exchanger within the outdoor unit 14 emits hot air while cooling and cold air while heating to supply cooling energy or heating energy to the indoor unit 12, respectively, the outdoor unit 14 may be installed at, for example, a position where an air passage is reserved for thermal exchange with the outdoor environment and that is not very far from the indoor unit 12, for example, on the ground, on the window balcony, on the roof, in the garage, in the yard, and the like. In some embodiments as shown here, the air conditioning unit 10 may include a height adjustable mounting assembly 100 for holding the outdoor unit 14 at the window 2. As shown in FIGS. 2 and 3, the adjustable mounting assembly 100 may be disposed on a window sill 3 of the window 2 and supported by a support leg against an exterior wall 5. It should be understood that the type of air conditioning unit that can be utilized with the adjustable mounting assembly 100 of the present disclosure can be many types of air conditioning units, including but not limited to the type of air conditioning unit disclosed in co-pending application U.S. application Ser. No. 17/566,416, filed on Dec. 30, 2021, the entire contents of which is herein incorporated by reference in its entirety.

The adjustable mounting assembly of the present disclosure may include various configurations and adjusting mechanisms. For example, as shown in FIGS. 3-8, the adjustable mounting assembly 100 relates to a counterbalance mechanism with one or more sliding assemblies 104 vertically moving in one or more vertical guide tracks 101 for supporting a first work surface/platform 106 mounted on a frame 102 for holding the outdoor unit 14 of the air conditioning unit 10. In such embodiments, the sliding element 104 may exert a substantially constant force on moving the outdoor unit 14 along with the platform 106 throughout the entire vertical travel along the vertical guide track 101. Referring to FIGS. 3-7, in such embodiments, the mounting assembly 100 may include the main frame 102 having an opening formed therein for receiving the platform 106 for holding the outdoor unit 14. The frame 102 may include the vertical guide track 101 with a first track end 101a and a second track end 101b, and a sliding element 104 may be slidable within the vertical guide track 101 between a first position at the first track end 101a and a second position at the second track end 101b. The first platform 106 may be supported by the sliding element 104, so that a height of the first platform 106 holding the outdoor unit 14 may be switched through a sliding movement of the sliding element 104 within the vertical guide track 101 between the first track end 101a and the second track end 101b. It should be understood that the first platform 106 may be omitted in some embodiments, for example, the outdoor unit 14 may be supported by the sliding element 104 directly. In such embodiments, the sliding element 104 may be fixed on the bottom side of the outdoor unit 14.

In some embodiments, the mounting assembly 100 may further include a horizontal connection rail 108 coupled to the frame 102. In such embodiments, the frame 102 may include a frame support bracket 102a for resting upon the horizontal connection rail 108. In some embodiments, the frame support bracket 102a of the frame 102 may include a plurality of frame adjusting openings 102b, and the horizontal connection rail 108 may also include a plurality of corresponding adjusting openings 108b. The adjusting openings 102b and 108b may be defined in a spaced-apart relation to adjust a relative position between the frame 102 and the horizontal connection rail 108 to adjust a distance of the frame 102 from the window 2. In some embodiments, the frame 102 may include a frame bottom plate 102c for supporting the platform 106 holding the outdoor unit 14 in an installed position. It should be understood that the frame bottom plate 102c and the platform 106 may have a variety of shapes such as, square, circular, or rectangular. It should be also understood that the frame bottom plate 102c and/or the platform 106 may be strong/rigid enough to support the weight of the outdoor unit 14 and prevent potential binding. In some embodiments, a cross member 102d may be provided to reinforce the stability of the frame 102.

Figure 7:
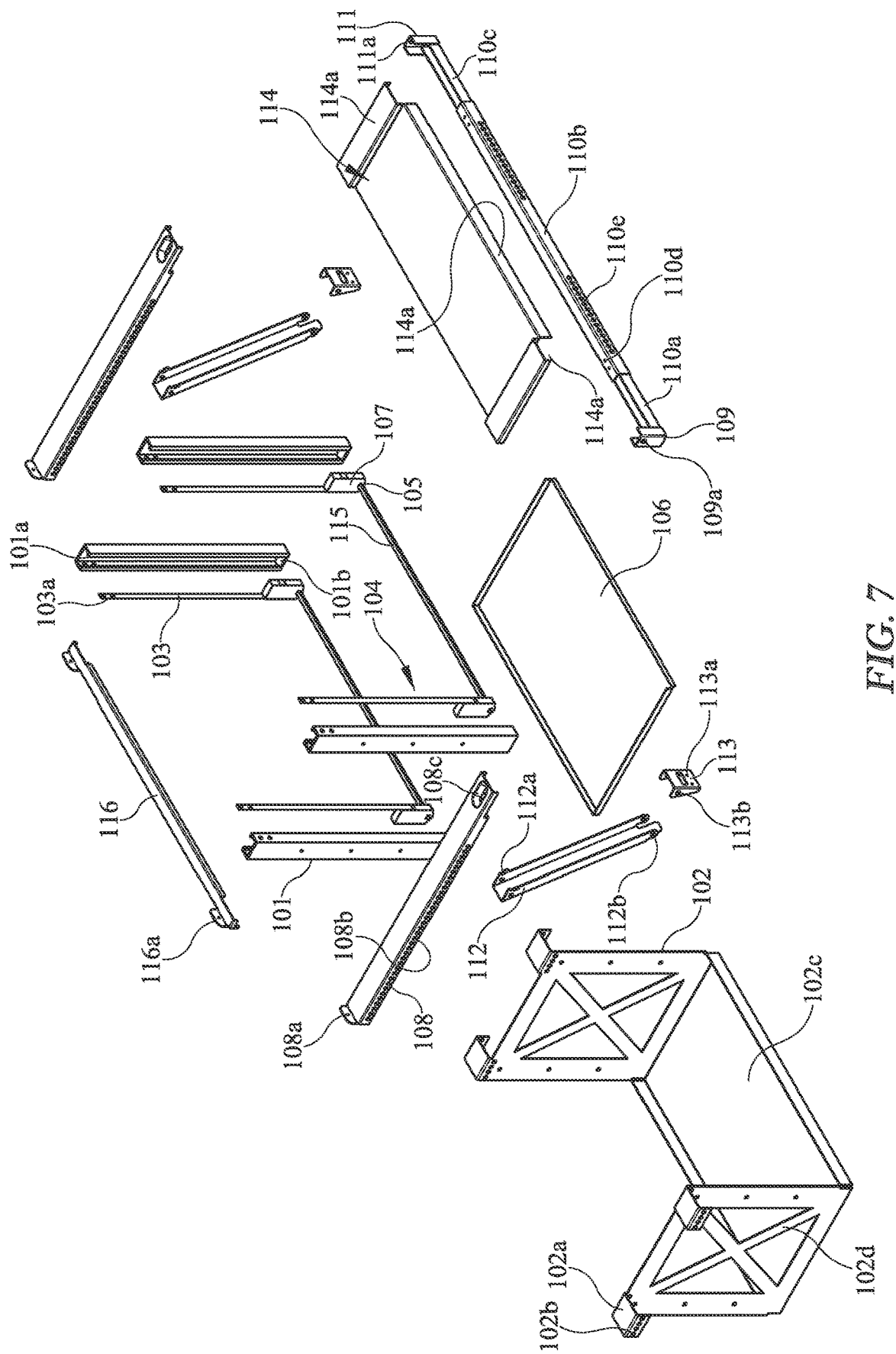
FIG. 7 is a perspective exploded view of the adjustable mounting assembly, according to one embodiment.

In some embodiments, a window support rail 110 with a first window rail support end 109 and a second window support rail end 111 may be coupled to the horizontal connection rail 108. For example, the horizontal connection rail 108 may include a fastener opening 108c for coupling with a window support rail fastener opening 110d. In some embodiments, a length of the window support rail 110 may be adjustable. For example, as best shown in FIG. 7, the window support rail 110 may include a plurality of telescoping rails 110a, 110b, and 110c, and the length of the window support rail 110 may be adjusted by adjusting a position of the plurality of telescoping rails 110a-c relative to one another. In some embodiments, the plurality of telescoping rails 110a-c may include a plurality of adjusting openings 110e as shown in FIG. 7 for adjusting the position of the plurality of telescoping rails 110a-c relative to one another to allow the first window support rail end 109 and the second window support rail end 111 to abut an inside jamb 4 surrounding the window 2 of various dimensions. When a desired length of the window support rail 110 is reached, a fastener (e.g., a screw) may be inserted through one of the plurality of adjusting openings 110e to fix the relative positions of the plurality of telescoping rails 110a-c.

In some embodiments, a wall support leg 112 with a wall support foot 113 may be provided to allow the mounting assembly 100 to rest against an exterior wall 5 below the window 2. The wall support leg 112 may be coupled to the horizontal connection rail 108 via fastening between a fastener opening 112a of the wall support leg 112 and one of the plurality of adjusting openings 108b of the horizontal connection rail 108. In such embodiments, the wall support foot 113 may be configured to abut a structure surface (e.g., the exterior wall 5) below the window 2, to provide additional support for the installation of the mounting assembly 100 besides the support by the window support rail 110. In some embodiments, the relative angles between the wall support foot 113 and the wall support leg 112 may be adjusted so that wall support foot 113 may abut a sloped structure surface below the window. In such embodiments, the adjustment may be achieved by rotating the wall support foot 113 about a support foot angle adjusting pivot 112b and 113b. In some embodiments, the first window support rail end 109, the second window support rail end 111, and the wall support foot 113 may further include a cushioned pad (e.g., foam, rubber, etc.), respectively, to increase the friction between the support end/foot and the window jamb/wall. In some other embodiments, instead of cushioned pads, the window support end 109, the second window support end 111, and the wall support foot 113 may include one or more fastener openings 109a, 111a, and 113a (e.g., for fasteners such as screws going through), respectively, for further securement of the mounting assembly 100.

Figure 4:
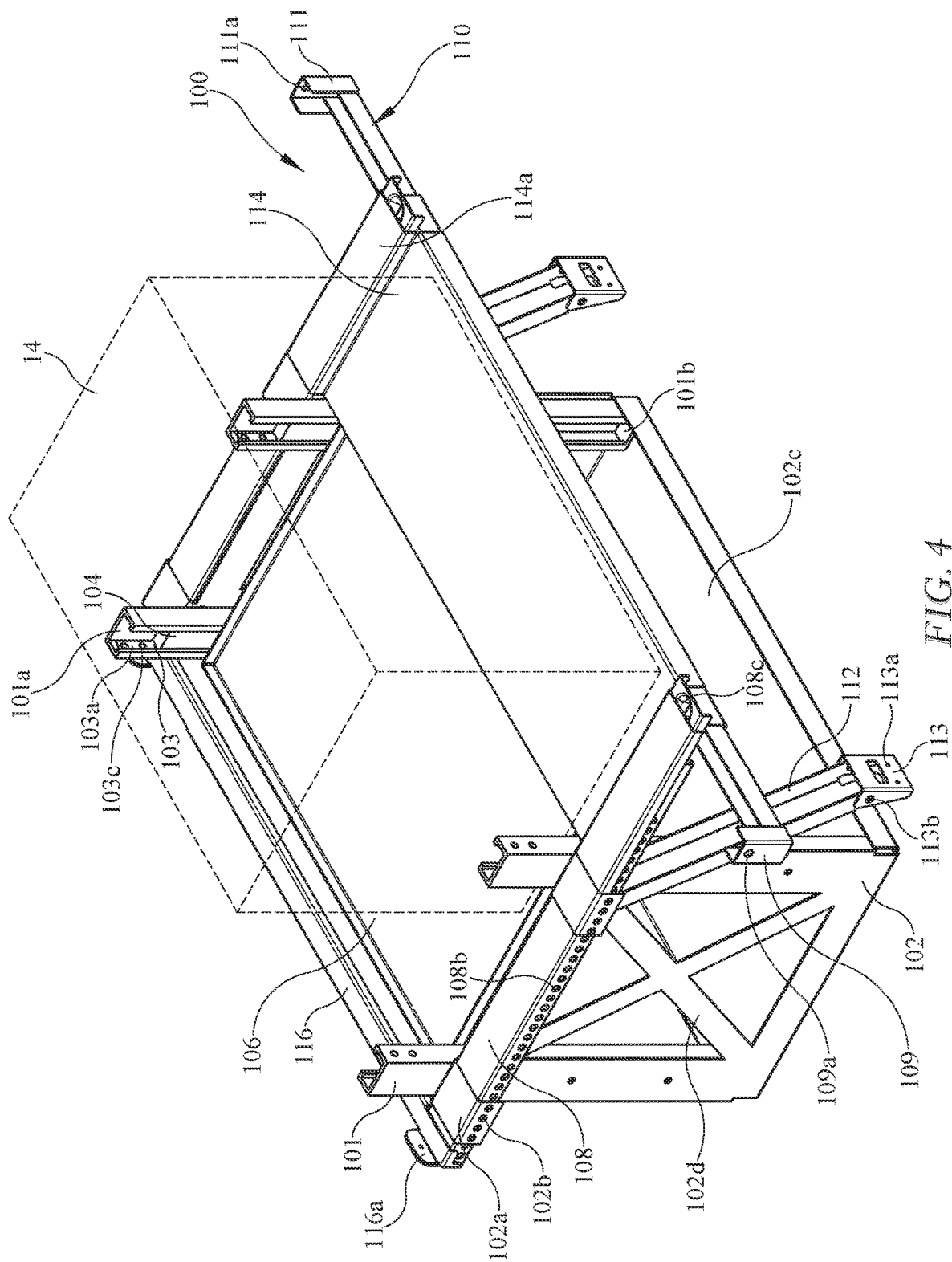
FIG. 4 is a perspective view of a second platform holding an outdoor unit of the adjustable mounting assembly, according to one embodiment.
Figure 5:
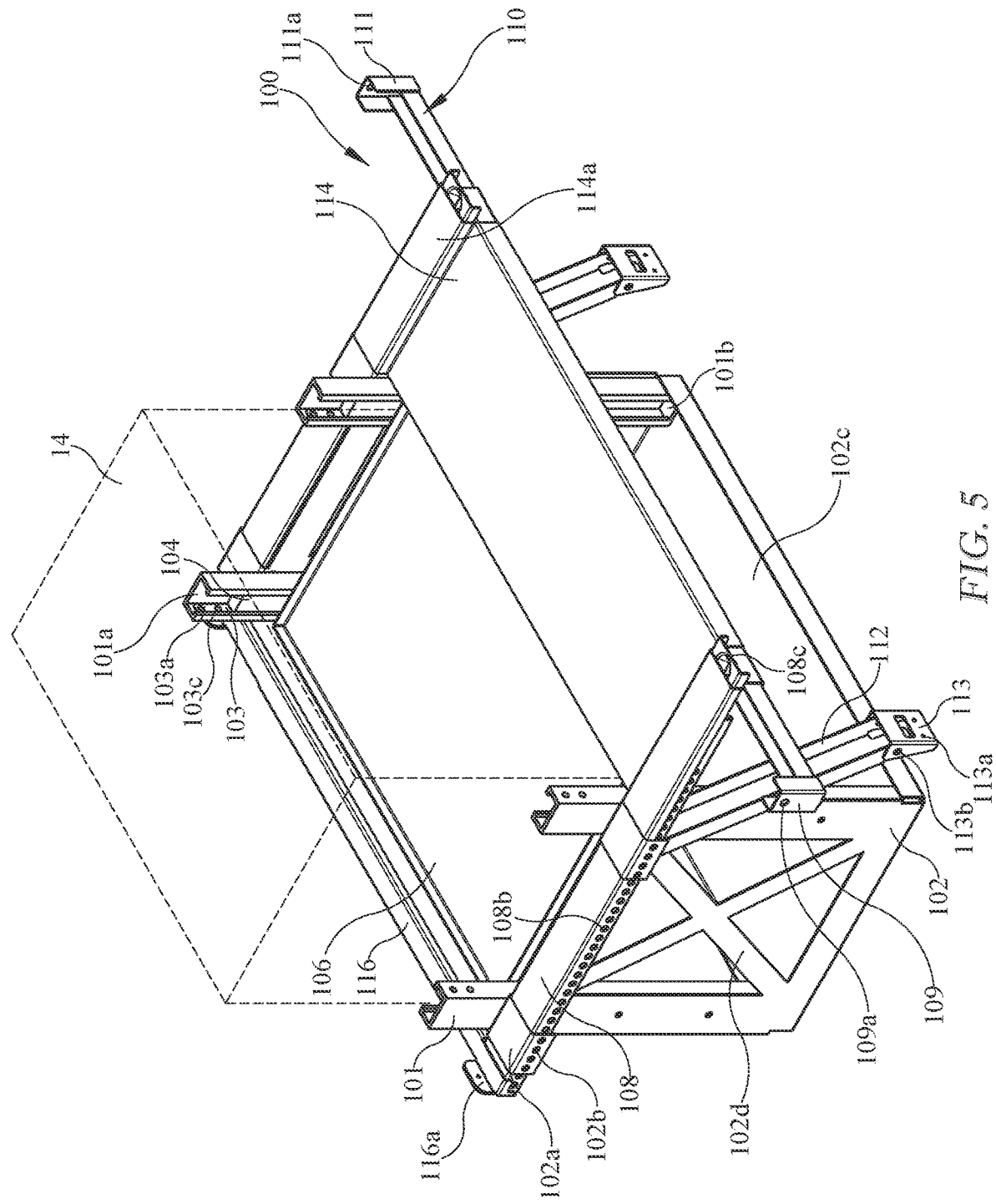
FIG. 5 is a perspective view of the mounting assembly schematically showing the outdoor unit moved from the second platform to a first platform and in a first, loading position on the adjustable mounting assembly, according to one embodiment.
Figure 6:
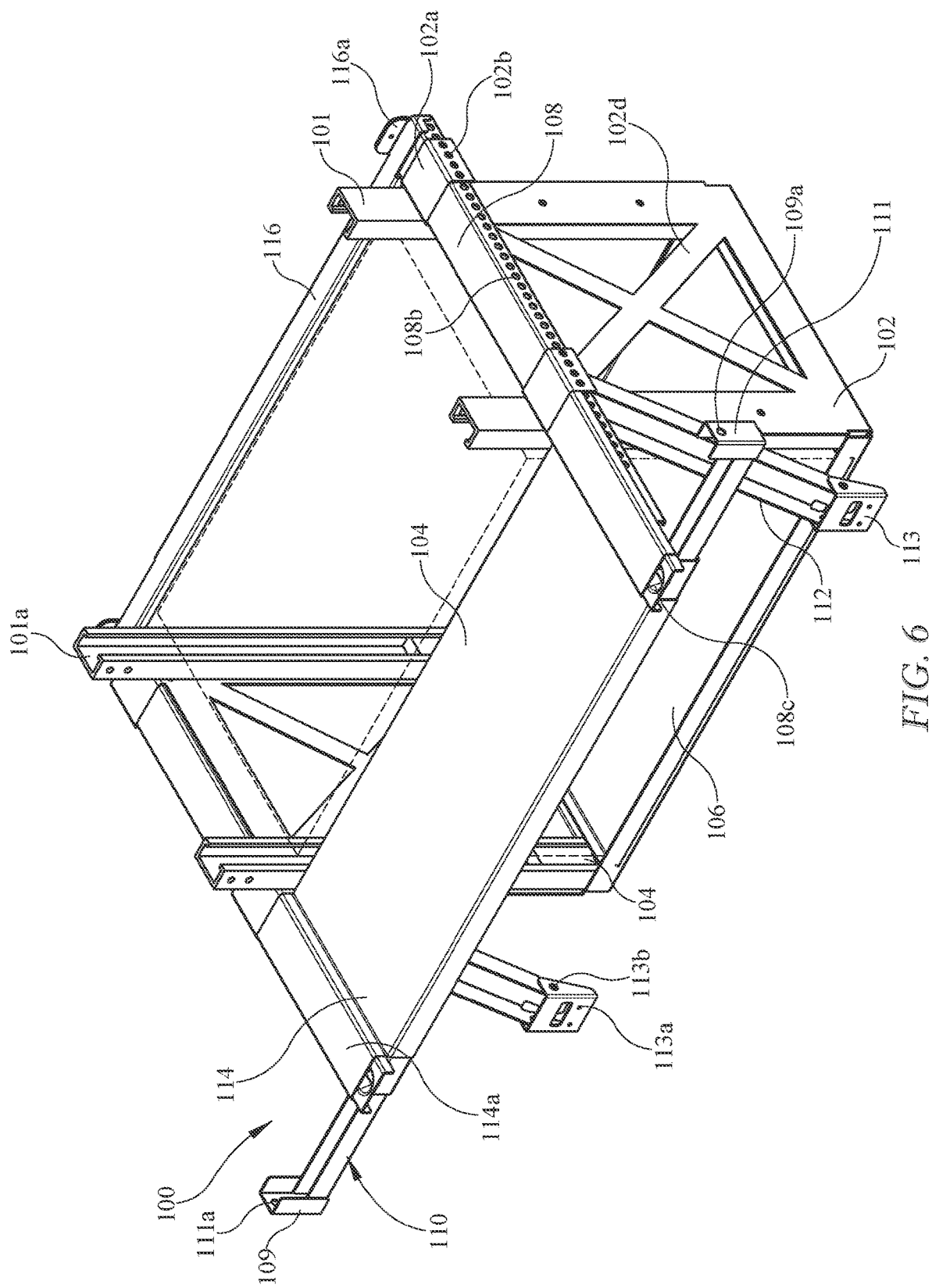
FIG. 6 is a perspective view of the mounting assembly showing the first platform holding the outdoor unit moved from a first, loading position to a second, installed position, according to one embodiment.

In some embodiments, the mounting assembly 100 may include a second platform 114 supported by the horizontal connection rail 108 for holding the outdoor unit 14 at the window sill 3 of the window 2 before the outdoor unit 14 is moved to the first platform 106 to facilitate the installation process. For example, as shown in FIGS. 4-6, the second platform 114 may include a second platform support bracket 114a for resting upon the horizontal connection rail 108, and the second platform 114 may be removable/slidable from the horizontal connection rail 108 after the outdoor unit 14 is moved to the first platform 106. In such embodiments, the first platform 106 may be configured to move between a first position and a second position. The first position may be a loading position in which the outdoor unit 14 is moved from the second platform 114 to the first platform 106 with a same height as the window sill 3 of the window 2, and the second position may be a final installed position in which the outdoor unit 14 is lowered as desired by a user to a position that does not block the window 2. In different embodiments, the outdoor unit 14 may be removably fixed to the first platform 106 (e.g., through one or more fasteners) before or after the outdoor unit 14 is lowered into the installed position, or the outdoor unit 14 may be not fixed to the first platform 106 at all.

In some embodiments, the mounting assembly 100 may include a horizontal reinforce rail 116 coupled to the horizontal connection rail 108 and being opposite to the window support rail 110. For example, a fastener may be inserted through a connection rail fastening bracket 108a of the horizontal connection rail 108 and a reinforce rail fastening bracket 116a of the horizontal reinforce rail 116 to couple the horizontal reinforce rail 116 to the horizontal connection rail 108 of the mounting assembly 100. In such embodiments, the horizontal reinforce rail 116 may further reinforce the strength of the frame 102 and secure the outdoor unit 14 during installation process, for example, prevent the outdoor unit 14 from sliding out from the frame 102.

Figure 8:
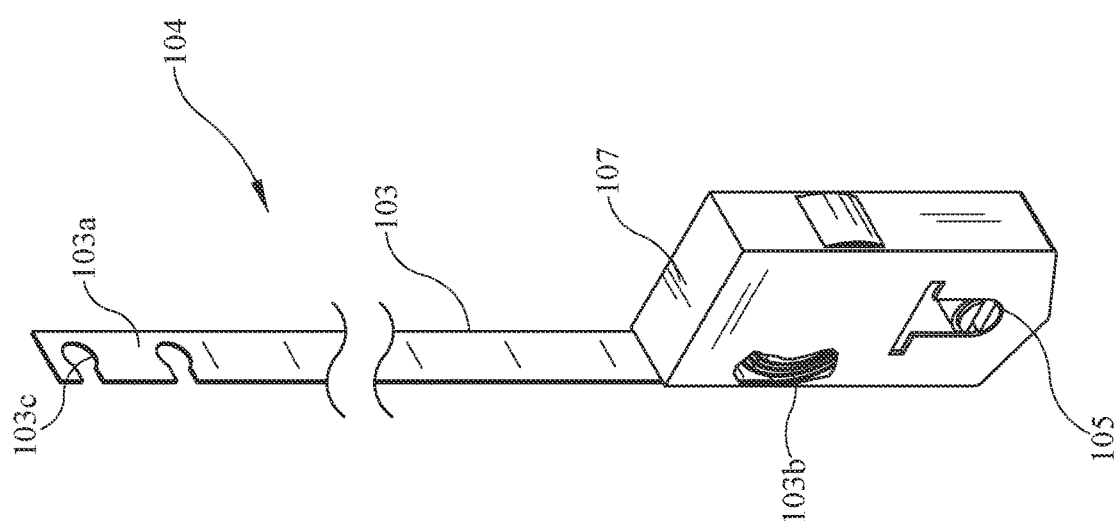
FIG. 8 is an enlarged view of a sliding element of the adjustable mounting assembly, according to one embodiment.
Figure 8C:
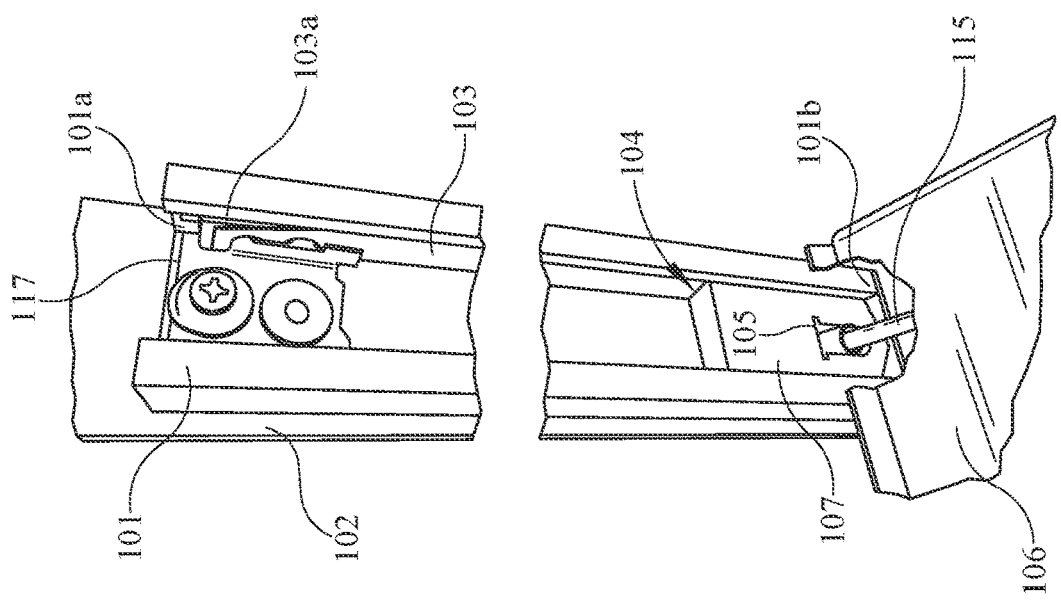
FIG. 8C is an enlarged view of the sliding element of FIG. 8 within a vertical guide track of the adjustable mounting assembly when the outdoor unit is in the second, installed position, according to one embodiment.
Figure 8B:
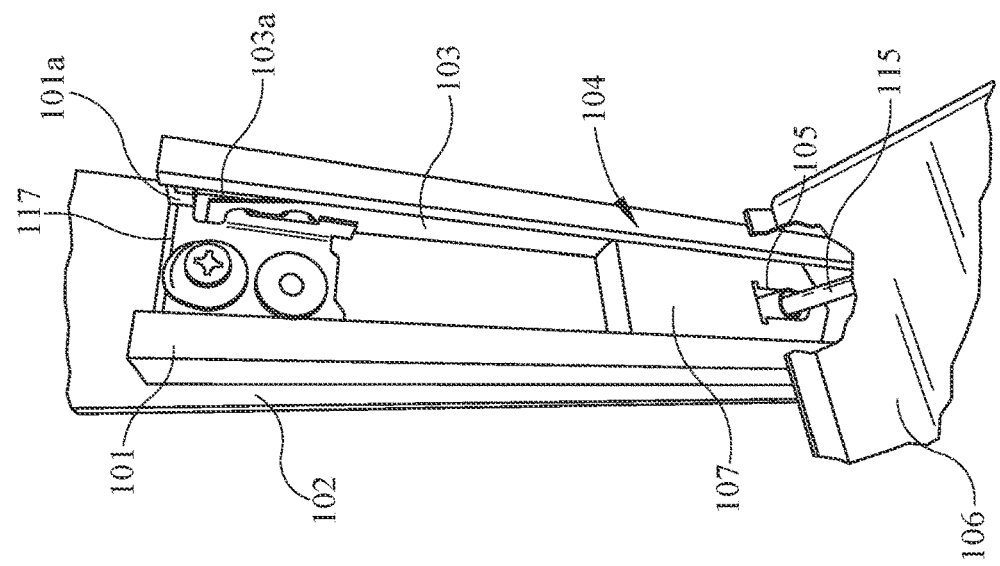
FIG. 8B is an enlarged view of the sliding element of FIG. 8 within the vertical guide track of the adjustable mounting assembly when the outdoor unit is moving between the first, loading position and the second, installed position, according to one embodiment.
Figure 8A:
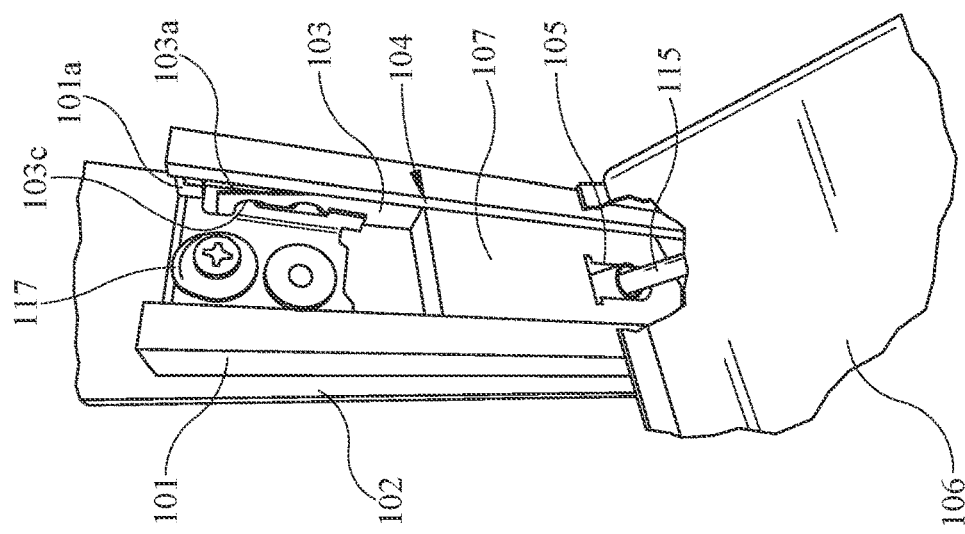
FIG. 8A is an enlarged view of the sliding element of FIG. 8 within the vertical guide track of the adjustable mounting assembly when the outdoor unit is in the first, loading position, according to one embodiment.

As mentioned previously, the present embodiments includes a counterbalance lifting mechanism to provide a counter-weighting force to offset the constant load of the outdoor unit 14 and the first platform 106. For example, as shown in FIGS. 8 and 8A-C, the sliding element 104 may include a carriage/spring housing 107 containing a spring coil 103 with a first spring end 103a and a second spring end 103b. The first spring end 103a may be coupled to the first track end 101a, and the second strip end 103b may be an end of the spring coil strip 103 within the spring housing 107. For example, the second strip end 103b of the spring 103 may be coupled to a pulley mounted within a spring housing 107. The spring coil 103 may be a thin, coiled steel ribbon/strap that is at rest when fully rolled up. As shown in FIGS. 8A and 8B, in some embodiments, the first spring end 103a of the spring coil 103 may include one or more spring openings 103c configured to couple to a spring fixation member 117 at the first track end 101a via a pin-slot mechanism. In some embodiments, as shown in FIG. 8A, the spring housing 107 may include an opening 105 for accommodating a platform support rail 115 to support the platform 106 as shown in FIGS. 7 and 8A-C. In some embodiments, instead of integrating the spring coil 103 into the spring housing 107, the spring coil 103 may also be integrated into the outdoor unit 14 and/or the vertical guide track 101 directly. It should be understood that the coupling between the first spring end 103a of the spring coil 103 and the first track end 101a, and the coupling between the first platform 106 and the sliding element 104 are not limited and may be in any known manners, such as welding, adhesion, molding, fastening, etc.

With the first spring end 103a of the spring coil 103 fixed at the first track end 101a of the vertical guide track 101 as shown in FIG. 8A, the spring coil 103 may become charged with force when the sliding element 14 is sliding within the vertical guide track 101 as shown in FIG. 8B by partially or completely unrolling the spring coil 103. When the second spring end 103b of the spring coil 103 is released without any counterbalance force, the spring coil 103 may recoil, pulling the extended second spring end 103b along with the spring housing 107 back and rolling up rightly. Accordingly, the spring coil 103 may be configured to lead the sliding element 104 to slide within the first guide track 101 between the first track end 101a and the second track end 101b. In some embodiments, the spring coil 103 may have a constant force value equal to the weight of the outdoor unit 14 combined with the first platform 106 supported thereby. For example, the constant force spring coil 103 may be tuned to hold the weight of the outdoor unit 14 and the first platform 106 in place until they are forced up or down by the user. In such embodiments, the weight of the outdoor unit 14 and/or the first platform 106 may offset the linear force exerted in conjunction with the spring coil 103 to provide a relatively constant counter-weighting force. Since the upward force provided by the spring coil 103 of the sliding element 104 may be equal to the weight of the outdoor unit 14 and the first platform 106, the user may only need to apply a small downward force to break the balance to push the unit down into the installed position. In some embodiments, the spring coil 103 may be balanced specifically to the center of the weight distribution of the outdoor unit 14 and the first platform 106 to provide a smooth translational movement. It should be understood that the constant force value of the spring coil 103 may be equal to the weight of the outdoor unit 14 in those embodiments that the first platform 106 is omitted and the outdoor unit 14 is supported by the counterbalance sliding element 104 directly.

In some embodiments, the constant force of the spring coil 103 may be adjustable for a different weight/load on the platform 106 (e.g., a different outdoor unit 14 thereon). This adjustment may be accomplished by adjusting the preload force on the spring coil 103, which may be achieved by changing the initial amount of compression of the spring coil 103. For example, for a greater load on the platform 106, the spring coil 103 may have a greater initial compression. It should be understood that the adjustment may also be achieved in any other known manners, such as using different spring coil materials. In some embodiments, the mounting assembly 100 may also be provided with a damping mechanism to increase the operation safety by preventing accelerated movement of the outdoor unit 14 and/or associated platform 106 if the load or weight of the object is changed. The damping mechanism may be a coil spring, a spring damper, a pneumatic spring (gas spring), or any other type of suitable components to slow the descent of the outdoor unit 14 during installation.

It should be understood that the number of the counterbalance sliding elements 104 may vary. For example, there may be only one or more than one sliding elements 104 within the vertical guide track 101. For example, in some embodiments, there may be sliding elements 104 at each vertical guide track 101 of the frame 102 (i.e. total four sliding elements 104), or there may be only two sliding elements 104 within opposite vertical guide tracks 101 (e.g., front and back, or left and right side) of the frame 102 with total four vertical guide tracks 101. For example, for a 28-pound outdoor unit 14, there may be four 7-pound force sliding elements 104 or two 14-pound force sliding elements 104. In some embodiments, the force of the plurality of sliding elements 104 may be not equal. For example, the sliding elements 104 may have different force values based on the weight distribution of the outdoor unit 14 and the first platform 106.

It should be understood that any suitable counterbalance spring or similar counterbalance mechanism configured to lift and support loads may be applied here to counteract the weight of the outdoor unit 14 and the first platform 106 and provide balance for user control. For example, the spring coil 103 may be a different force storage mechanism instead of a coil spring, such as for instance, a pneumatic spring (also known as a gas spring), so that the platform 106 may be supported by a variety of counterbalance mechanisms to balance the weight of the outdoor unit 14 thereon and to assist in the translation of the unit up and down.

Figure 9:
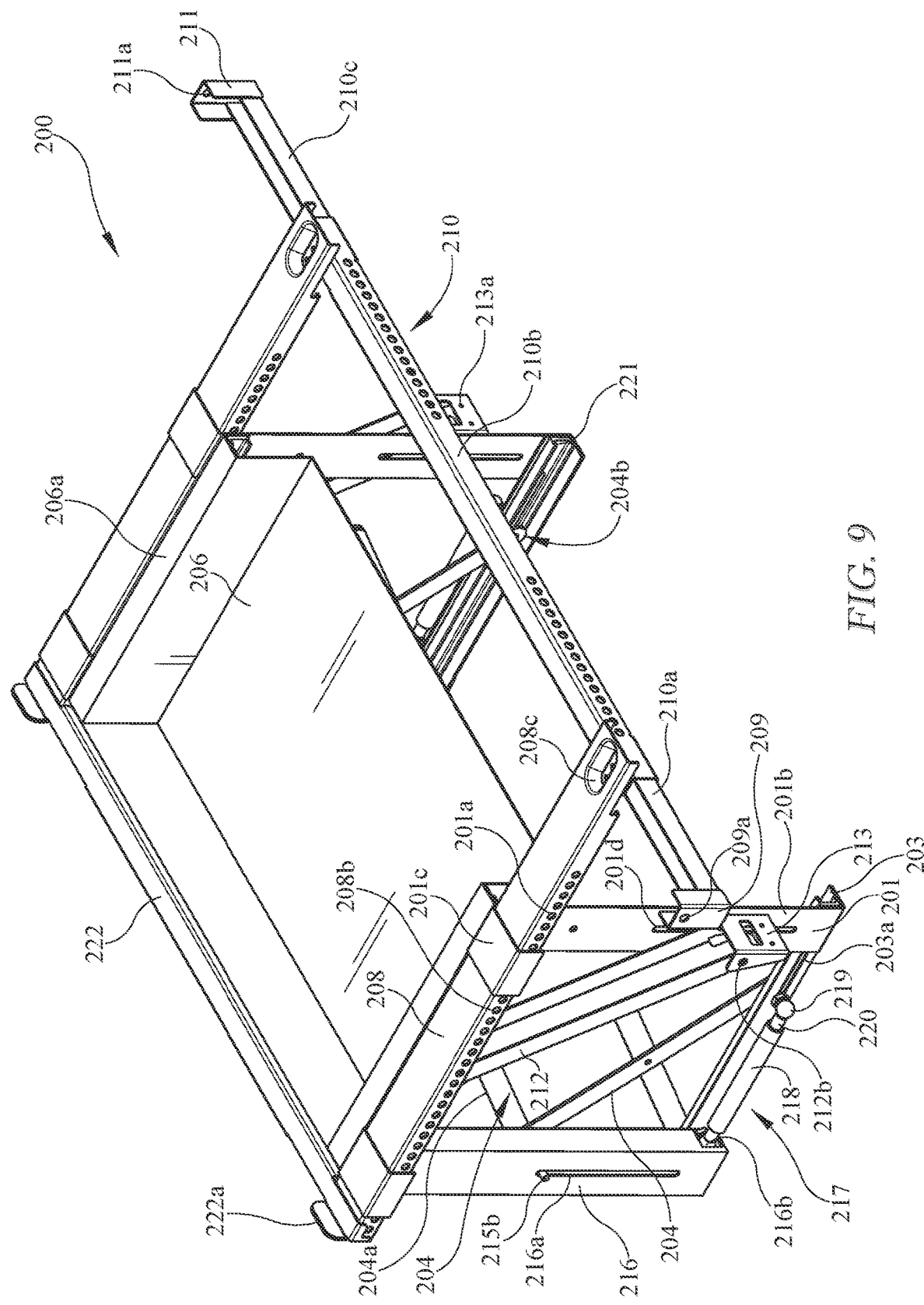
FIG. 9 is a perspective view of an adjustable mounting assembly according to a second embodiment, showing a platform thereof for holding an outdoor unit of an air conditioning unit in a first, loading position.
Figure 10:
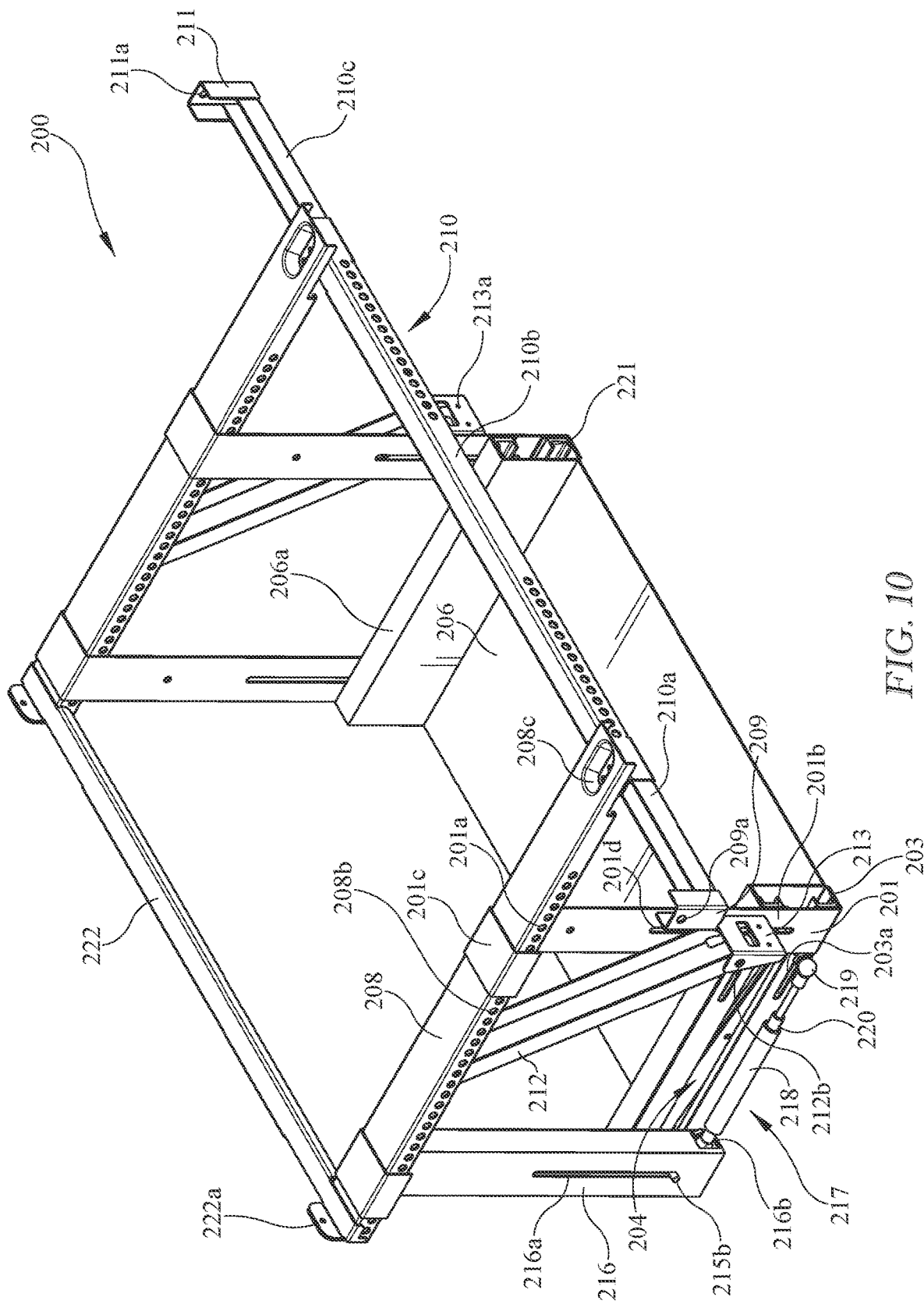
FIG. 10 is a perspective view of the adjustable mounting assembly of FIG. 9 when the platform thereof is in a second, installed position.
Figure 11:
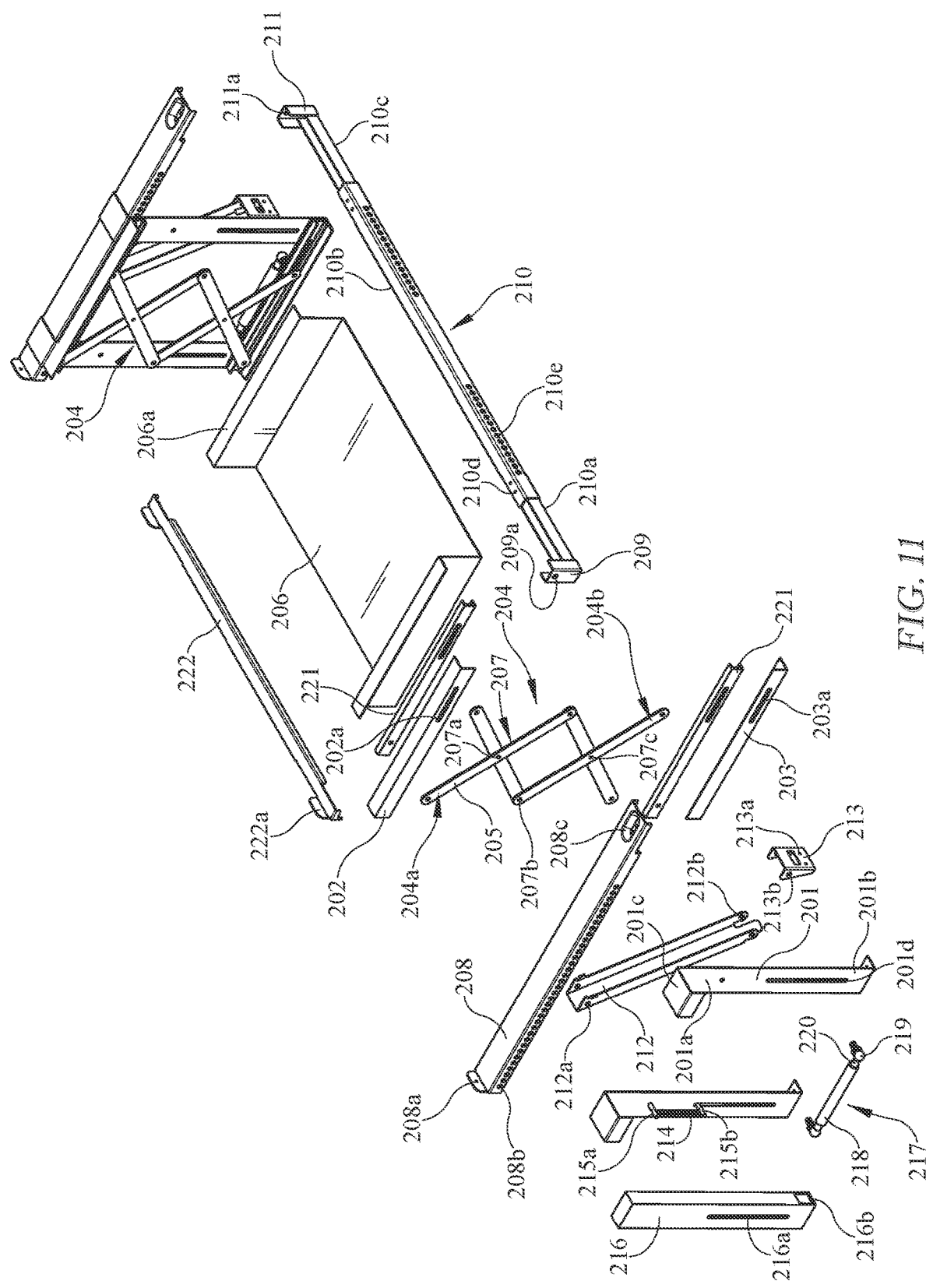
FIG. 11 is a perspective exploded view of the adjustable mounting assembly of FIGS. 9 and 10.

In some other embodiments, different lifting mechanisms may be used. FIGS. 9-11 illustrate a second embodiment of an adjustable mounting assembly 200 that embodies the principles of a scissor lifting mechanism 204. The scissor lifting mechanism 204 is a means for altering the height of a platform 206 by controlling the sliding positions of the plurality of scissor rods 205 to raise or lower the platform 206. In such embodiments, as shown in the exploded view of FIG. 11, the mounting assembly 200 may include a top horizontal guide bracket 202 and a bottom horizontal guide bracket 203 positioned parallel to each other, and a scissor lifting mechanism 204 including a plurality of pivoted scissor rods 205 may be arranged therebetween. The top horizontal guide bracket 202 and the bottom horizontal guide bracket 203 may include a top horizontal guide track 202a and a bottom horizontal guide track 203a, respectively. In some embodiments, the top horizontal guide bracket track 202a and the bottom horizontal guide track 203a may be a slot (e.g., a projecting linear bar) built in the top horizontal guide bracket 202 and the bottom horizontal guide bracket 203, respectively, on or in which the scissor rod 205 may slidably engage. In some embodiments, a bottom surface of the platform 206 may be coupled to the top horizontal guide bracket 202 to connect the plurality of scissor rods 205 to the platform 206. In some embodiments, the top horizontal guide bracket 202 and the track 202a may be integral with the bottom surface of the tabletop platform 206, such as a slot through molding, routing, casting, or machining. Alternatively, the top horizontal guide bracket 202 and the track 202a may be separate components, such as shown here, attached to a platform support 206a of the platform support bracket 206 in any known manner, such as welding, adhesion, molding, fastening, etc.

In some embodiments, the scissor lifting mechanism 204 may include a first, top section 204a slidably coupled within the top horizontal guide track 202a and a second, bottom section 204b slidably coupled within the bottom horizontal guide track 203a. A platform 206 may be supported by the scissor lifting mechanism 204, so that the height of the platform 206 holding the outdoor unit 14 may be adjustable through a sliding movement of the scissor lifting mechanism 204 within the top horizontal guide bracket 202 and the bottom horizontal guide bracket 203. For example, the platform 206 may be configured to move from the first, loading position as shown in FIG. 9 to the second, installed position as shown in FIG. 10 in a controlled motion. Furthermore, the scissor lifting mechanism 204 may include a plurality of scissor rods 205 as the primary components of the scissor lifting mechanism. In some embodiments, the scissor lifting mechanism 204 may be a two-stage scissor lifting mechanism, and the plurality of scissor rods 205 (e.g., four rods as shown in FIGS. 9-11) may be coupled to each other through a plurality of pivots 207 (e.g., a top, first pivot 207a, a middle, second pivot 207b, and a bottom, third pivot 207c), which allow the scissor lifting mechanism 204 to perform an extension motion and a contractive motion. For the scissor lifting mechanism 204 as shown here, the first pivot 207a and the third pivot 207c may be positioned approximately in the middle along the length of the scissor rod 205, and the second pivot 207b may be positioned between the pivot 207a and the third pivot 207c and at the end of the scissor rod 205. Consequently, the plurality of rods 205 may be rotatably connected at the first, second, and third pivots 207a-c, which creates a range of motion that facilitates the extension motion and the contractive motion of the scissor lifting mechanism 204. The plurality of scissor rods 205 of the scissor lifting mechanism 204 may be connected to the platform 206 in such a manner to be able to slide through a plurality of positions with respect to one another, providing the platform 206 with different heights. For example, the plurality of rods 205 of the scissor lifting mechanism 204 translates towards each other while the platform 206 in the first, loading position as shown in FIG. 9 and may translate apart while the platform 206 in the second, installed position as shown in FIG. 10.

In some embodiments, the top end section 204a and the bottom end section 204b of the scissor lifting mechanism 204 may include a scissor sliding element to facilitate the sliding movement of the plurality of scissor rods 205. In some embodiments, the scissor sliding element at the top end section 204a and the bottom end section 204b may be a leg sliding bracket and be attached to the end of the scissor rod 205 through a fastener, such as a bolt. In some other embodiments, the scissor sliding element may include be leg sliding roller. In some embodiments, the top horizontal guide bracket 202 and the bottom horizontal guide bracket 203 may further include a sliding element track 221, respectively, for coupling the plurality of sliding elements. In some embodiments, there may be a plurality of scissor lifting mechanisms 204 that are positioned in a manner to uniformly support the platform 206. For example, there may be two scissor lifting mechanisms 204 opposite each other as shown here.

In some embodiments, the adjustable mounting assembly 200 may also include a horizontal connection rail 208 coupled to the scissor lifting mechanism 204 via the top horizontal guide track 202. In such embodiments, the adjustable mounting assembly 200 may further include a vertical guide plate 201 with a first, top guide plate end 201a and a second, bottom guide plate end 201b. The first guide plate end 201a may be coupled to the horizontal connection rail 208 and the top horizontal guide bracket 202 as shown in FIG. 11, and the second guide plate end 201b may be coupled to the bottom horizontal guide bracket 203. In some embodiments, the horizontal connection rail 208 may also include a plurality of corresponding opening 208b defined in a spaced-apart relation to adjust a relative position between the vertical guide plate 201 and the horizontal connection rail 208 to adjust a distance of the mounting assembly 200 from the window 2. In some embodiments, the vertical guide plate 201 may include a vertical guide support bracket 201c for coupling to the horizontal connection rail 208. In some embodiments, the mounting assembly 200 may also include a second platform (not shown here) supported by the horizontal connection rail 208 for holding the outdoor unit 14 at the window sill 3 of the window 2 before the outdoor unit 14 is moved to the platform 206 to facilitate the installation process.

In some embodiments, the vertical guide plate 201 may further include a tension spring 214 coupled to the scissor lifting mechanism 204 and expanded/compressed along a vertical guide plate track 201d on the vertical guide plate 201 for damping the lifting movement thereof. In some embodiments, one or both ends of the spring 214 may be attached to one or more spring coupling shaft 215. For example, in some embodiments as shown in FIG. 11, a top, fixed end of the spring 214 may be attached to the vertical guide plate 201 via a first coupling shaft 215a, and a bottom, moving end of the spring 214 may be attached to a second coupling shaft 215b. In some embodiments, the second coupling shaft 215b may be coupled to the scissor lifting mechanism 204 via one of the plurality of scissor rod pivots 207 (e.g., coupling the second coupling shaft 215b to the second pivot 207b as shown here). In some embodiments, a vertical slot shaped spring housing 216 with a spring housing track 216a corresponding to the vertical guide plate track 201d may be provided on the vertical guide plate 201 for containing the spring 214. It should be understood that the locations/configurations/dimensions of the vertical guide plate track 201d and the spring housing track 216a may be varied based on the configurations of the spring 214. In such embodiments with the tension spring 214, the lifting movement may be controlled in part by the extended spring 214 attached to the scissor lifting mechanism 204, so that the spring 214 is extended and provides a lifting force when the platform 206 is in the installed position, but does not provide any lifting force after the platform 206 rises to a certain height. In some embodiments, the moving end of the spring 214 may be mounted to the platform 206 instead of the scissor lifting mechanism 204.

In some embodiments, one or more gas spring (pneumatic) mechanisms 217 may also be provided to stabilize the extension and the contractive motions of the scissor lifting mechanism 204. In some embodiments, the gas spring mechanism 207 may be positioned adjacent to the horizontal bottom guide track 203 of the scissor lifting mechanism 204 as shown in FIGS. 9-11. In some embodiments with plurality of scissor lifting mechanisms 204, each scissor lifting mechanism 204 may be provided with the gas spring mechanisms 217 for a uniform motion control. In some embodiments, the gas spring mechanism 217 may include a cylinder end 218 and a piston end 219, which are positioned opposite to each other along the length of a piston rod 220. The cylinder end 218 may be connected to the translational pivot end 219 through the piston rod 220. Thus, the gas spring mechanisms 217 may exert a force on the scissor lifting mechanism 204 to compensate for the weight of the outdoor unit 14 and/or the platform 206 during motion. In some embodiments as shown in FIG. 10, the cylinder end 218 may be coupled to the horizontal bottom guide track 203 through a spring house opening 216b, and the piston end 219 may be coupled to the bottom end section 204b of the scissor lifting mechanisms 204 through the bottom horizontal guide track 203a. The cylinder end 218 may be filled with compressed gas that is used to quickly force the piston end 219 through a driving stroke movement. During operation, when the platform 206 is in the first, loading position, the piston end 2019 may also be in its starting position with compressed gas within the cylinder end 218 thereby preparing for the driving stroke led by the scissor lifting mechanisms 204 to move the platform 206 to the second, installed position in a controlled manner. Thus, the piston end 209 may move back and forth along the bottom horizontal guide track 203a as the gas spring mechanism 217 compresses or expands for damping the movement of the scissor lifting mechanism 204. In some embodiments, the strength of the gas spring mechanisms 217 may be adjusted based on the load of the outdoor unit 14 placed on the platform 206.

In some embodiments, a window support rail 210 may be coupled to the horizontal connection rail 208. For example, the horizontal connection rail 208 may include a fastener opening 208c for coupling with a window support rail fastener opening 210d. In some embodiments, a length of the window support rail 210 may be adjustable. For example, as best shown in FIG. 11, the window support rail 210 may include a plurality of telescoping rails 210a, 210b, and 210c, and the length of the window support rail 210 may be adjusted by adjusting a position of the plurality of telescoping rails 210a-c relative to one another. In some embodiments, the plurality of telescoping rails 210a-c may include a plurality of adjusting openings 210e as shown in FIG. 11 for adjusting the position of the plurality of telescoping rails 210a-c relative to one another to allow the first window support rail end 209 and the second window support rail end 211 to abut the inside jamb 4 surrounding the window 2 of various dimensions. When a desired length of the window support rail 210 is reached, a fastener (e.g., a screw) may be inserted through one of the plurality of adjusting openings 210e to fix the relative positions of the plurality of telescoping rails 210a-c.

In some embodiments, a wall support leg 212 with a wall support foot 213 may be provided to allow the mounting assembly 200 to rest against the exterior wall 5 below the window 2. The wall support leg 212 may be coupled to the horizontal connection rail 208 via fastening between a coupling opening 212a of the wall support leg 212 and one of the plurality of adjusting openings 208b of the horizontal connection rail 208. In such embodiments, the wall support foot 213 may be configured to abut the exterior wall 5 below the window 2, to provide additional support for the installation of the mounting assembly 200 besides the support by the window support rail 210. In some embodiments, the relative angles between the wall support foot 213 and the wall support leg 212 may be adjusted so that wall support foot 213 may abut a sloped structure surface below the window. In such embodiments, the adjustment may be achieved by rotating the wall support foot 213 about a support foot angle adjusting pivot 212b and 213b. In some embodiments, the first window support rail end 209, the second window support rail end 211, and the wall support foot 213 may further include a cushioned pad (e.g., foam, rubber, etc.), respectively, to increase the friction between the support end/foot and the window jamb/wall. In some other embodiments, instead of cushioned pads, the window support end 209, the second window support end 211, and the wall support foot 213 may include one or more fastener openings 209a, 211a, and 213a (e.g., for fasteners such as screws going through), respectively, for further securement of the mounting assembly 200.

In some embodiments, the mounting assembly 100 may include a horizontal reinforce rail 222 coupled to the horizontal connection rail 208 and being opposite to the window support rail 210. For example, a fastener may be inserted through a connection rail fastening bracket 208a of the horizontal connection rail 208 and a reinforce rail fastening bracket 222a of the horizontal reinforce rail 222 to couple the horizontal reinforce rail 222 to the horizontal connection rail 208 of the mounting assembly 200. In such embodiments, the horizontal reinforce rail 216 may further reinforce the strength of the mounting assembly 200 and secure the outdoor unit 14 during installation process, for example, prevent the outdoor unit 14 from sliding out from the mounting assembly 200.

It should be understood that the fastener used for outdoor unit mounting assembly 100, 200 may be any other suitable configurations/mechanisms, such as, a nut combined with a screw/shaft, geometric coupling (e.g., pin and slots, French cleats, etc.), and fasteners of many types (e.g., screws, rivets, pins, ball detents, etc.). It should be also understood that various fastening features (e.g., snaps or spring clips, swaged/flared pins, bendable tabs, etc.) may be additionally provided for further securement, without risk of loosening or displacement, while further easing the installation process. In some embodiments, the mounting assembly 100, 200 may be made from one or more of metal, plastic, composite, or other materials known in the industry that provides the properties of rigidity and weather resistance for mounting on various structures. For example, in some embodiments, the mounting assembly 100, 200 may be manufactured from hard plastic or metal (e.g., stainless steel, aluminum, etc.). In some embodiments, the mounting assembly 100, 200 may be painted with a water proof UV-resistant material. Thus, the mounting assembly 100, 200 may be configured to support outdoor unit 14 steadily during severe weather.

Figure 12:
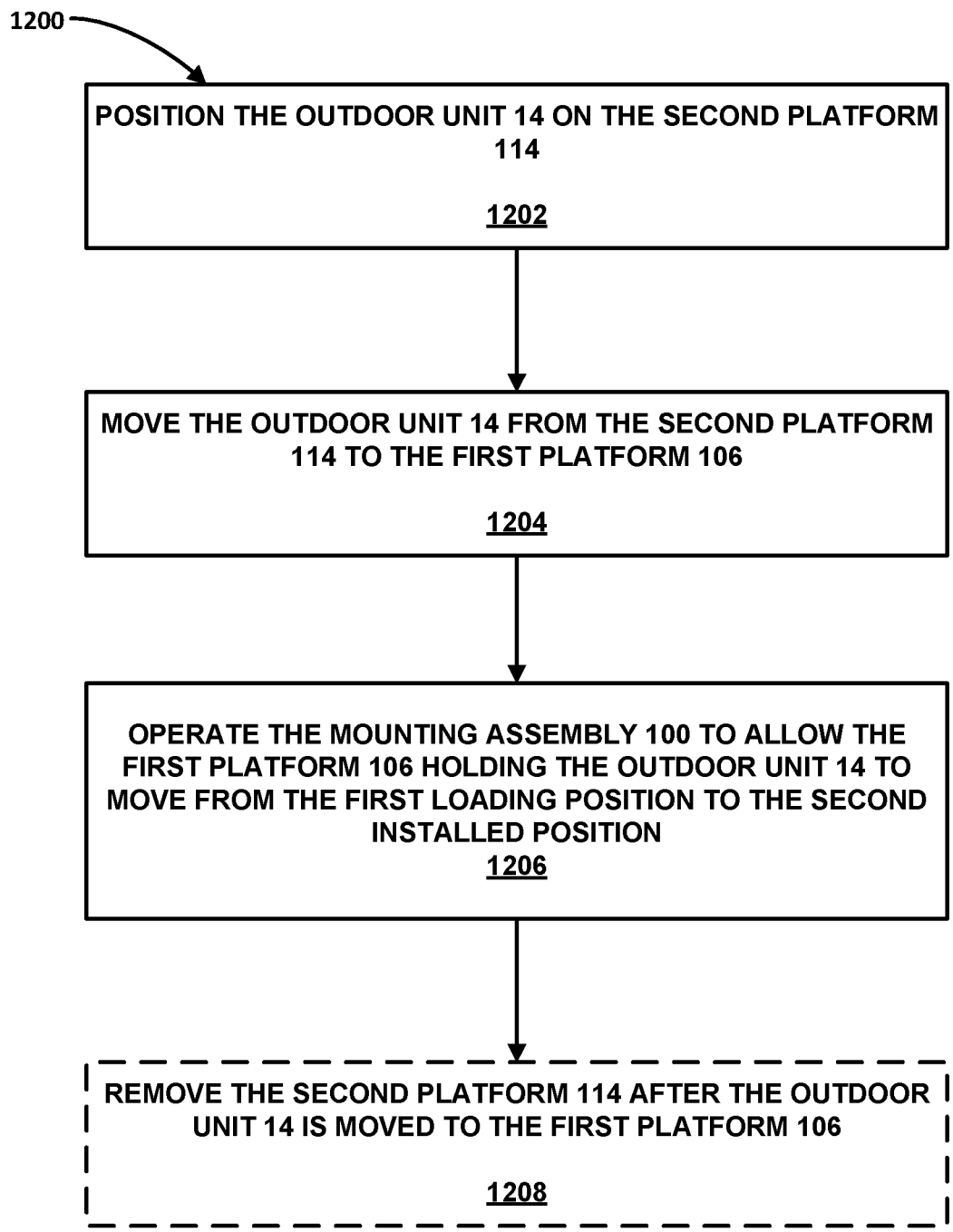
FIG. 12 is a flowchart illustrating an example sequence of operating an adjustable mounting assembly, according to one embodiment.

FIG. 12 illustrates a flowchart of an example sequence 1200 of operations for installing the outdoor unit 14 of the air conditioning unit 10 using the adjustable mounting assembly 100 as shown in FIGS. 2-8. Sequence 1200 begins in block 1202 by positioning the outdoor unit 14 on the second platform 114 of the mounting assembly 100 as shown in FIG. 4. Next, the user may move the outdoor unit 14 on the outdoor unit mounting assembly 100 from the second platform 114 to the first platform 106 in block 1204 as shown in FIG. 5. Then, the user may operate the mounting assembly 100 to allow the first platform 106 holding the outdoor unit 14 to move from the first, loading position to the second, installed position as shown in FIG. 6 in block 1206 as desired, for a full window view. In some embodiments, the user may remove the second platform 114 from the mounting assembly 100 after the outdoor unit 14 is moved from the second platform 114 to the first platform 106 in the dashed block 1208 as desired by the user. In some embodiments, the operation of the mounting assembly 100 to move the outdoor unit 14 from the first, loading position to the second, installed position may include manually pushing down the outdoor unit 14 on the first platform 106 by the user.

Figure 13:
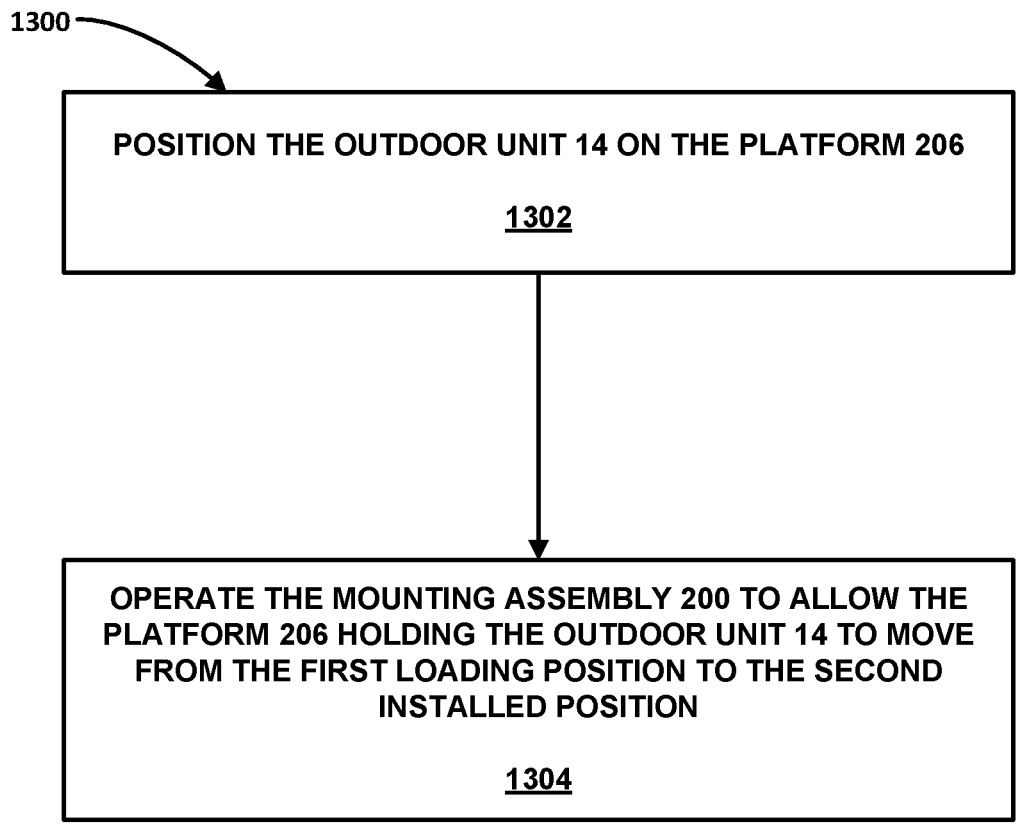
FIG. 13 is a flowchart illustrating an example sequence of operating an adjustable mounting assembly, according to the second embodiment.

FIG. 13 illustrates a flowchart of an example sequence 1300 of operations for installing the outdoor unit 14 of the air conditioning unit 10 using the adjustable mounting assembly 200 as shown in FIGS. 9-11. Sequence 1300 begins in block 1302 by positioning the outdoor unit 14 on the platform 206 of the mounting assembly 200 as shown in FIG. 9. Next, the user may operate the mounting assembly 200 to move the outdoor unit 14 on the platform 206 from the first, loading position to the second, installed position as shown in FIG. 10 in block 1304. It should be understood that the operation of the adjustable mounting assembly 200 is similar here as the user may also raise or lower the platform 206 holding the outdoor unit 14 by manually applying a downward or upward force. Thus, with the adjustable mounting assembly 100, 200, the installation of the outdoor unit 14 is easy to achieve, requiring merely positioning the outdoor unit 14 on the assembly and pushing down the unit. The outdoor unit 14 may then be disposed in a position substantially flush with or below the level of the window sill 3 of the window 2 as shown in FIGS. 2 and 3, so that the user may be able to open/close the window 2 freely with a full window view.

In summary, the installation of the proposed adjustable mounting assembly 100, 200 may be achieved by its DIY capable design without the need of a professional air conditioning technician. The proposed adjustable mounting assembly 100, 200 for air conditioning outdoor unit provides an easy solution with a low cost to a full window view after installation. The adjustable mounting assembly 100, 200 is durable and easy to construct, allowing for an easy height adjustment of the outdoor unit 14 mounted thereon without consuming electricity. The mounting assembly 100, 200 enables a user to easily lower the outdoor unit 14 by applying a relatively small downward force on the unit. The simple structures of the proposed adjusting mechanisms not only ease the operation and maintenance but also reduce the manufacture cost.

It should also be understood that the mounting assembly 100, 200 may be a variety of constructions, shapes, sizes, quantities, and positions but still accomplish the same intent.

The elements depicted in the figures may not be drawn to scale and thus, the elements may have different sizes and/or configurations other than as shown in the figures.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

What is claimed is:

1. An adjustable mounting assembly for an outdoor unit of an air conditioning unit, comprising:
   a frame having a vertical guide track with a first track end and a second track end;
   a sliding element slidable within said vertical guide track between a first position at said first track end and a second position at said second track end, wherein said sliding element is configured to support said outdoor unit, and said sliding element is configured to move said outdoor unit to a plurality of height positions by sliding within said vertical guide track between said first track end and said second track end;
a horizontal connection rail coupled to said frame;
a window support rail coupled to said horizontal connection rail and having a first window support rail end and a second window support rail end;
a wall support leg coupled to said horizontal connection rail and coupled to a wall support foot, wherein said first window support rail end and said second window support rail end are configured to abut an inside jamb surrounding a window, and said wall support foot is configured to abut a structure surface below said window; and
wherein said frame and said horizontal connection rail include a plurality of adjusting openings defined in a spaced-apart relation to adjust a relative position between said frame and said horizontal connection rail to adjust a distance of said frame from said window.

2. The adjustable mounting assembly of claim 1, further comprising a first platform supported by said sliding element for holding said outdoor unit.

3. The adjustable mounting assembly of claim 2, further comprising a second platform supported by said horizontal connection rail for holding said outdoor unit at a window sill of said window.

4. The adjustable mounting assembly of claim 3, wherein said first platform is configured to move between a first position and a second position, wherein said first position is a loading position in which said first platform is configured to enable said outdoor unit to be moved from said second platform to said first platform at a same height as said window sill of said window, and said second position is an installed position in which said first platform is configured to enable said outdoor unit to be arranged in a lower position so as to not block said window.

5. The adjustable mounting assembly of claim 3, wherein said second platform is slidable and/or removable from said horizontal connection rail.

6. The adjustable mounting assembly of claim 2, wherein said first platform is configured to enable said outdoor unit to be removably fixed thereon.

7. The adjustable mounting assembly of claim 1, wherein a length of said window support rail is adjustable.

8. The adjustable mounting assembly of claim 7, wherein said window support rail includes a plurality of telescoping rails, and said length of said window support rail is adjustable by adjusting said plurality of telescoping rails relative to one another.

9. The adjustable mounting assembly of claim 1, wherein said wall support foot is adjustable relative to said wall support leg to abut said structure surface below said window at different angles.

10. The adjustable mounting assembly of claim 1, further comprising a horizontal reinforce rail coupled to said horizontal connection rail and being opposite to said window support rail.

11. The adjustable mounting assembly of claim 1, wherein said sliding element includes a spring housing containing a spring coil with a first spring end and a second spring end, wherein said first spring end is coupled to said first track end of said vertical guide track and said second spring end is arranged within said spring housing, so that said spring coil is configured to lead said sliding element to slide within said vertical guide track between said first track end and said second track end.

12. The adjustable mounting assembly of claim 11, wherein said spring coil has a constant force value predetermined to be equal to a first weight.

13. The adjustable mounting assembly of claim 12, wherein said constant force value of said spring coil is adjustable by changing an initial amount of compression to accommodate a second weight different from said first weight.

14. An adjustable mounting assembly for an outdoor unit of an air conditioning unit, comprising:
a frame having a plurality of vertical guide tracks, wherein each vertical guide track of said plurality of vertical guide tracks has a first track end and a second track end;
a plurality of sliding elements vertically slidable within said plurality of vertical guide tracks, wherein at least one sliding element of said plurality of sliding elements is configured to slide between said first track end of at least one vertical guide track of said plurality of vertical guide tracks and said second track end of said at least one vertical guide track;
a first platform supported by said plurality of sliding elements within said plurality of vertical guide tracks, wherein said first platform is configured to hold said outdoor unit and is moveable through a sliding movement of said plurality of sliding elements within said plurality of vertical guide tracks;
a horizontal connection rail coupled to said frame, wherein said frame has a frame support bracket adjustably arranged on said horizontal connection rail;
a window support rail coupled to said horizontal connection rail and having a first window support rail end and a second window support rail end;
a wall support leg coupled to said horizontal connection rail and coupled to a wall support foot, wherein said first window support rail end and said second window support rail end are configured to abut an inside jamb surrounding a window, and said wall support foot is configured to abut a structure surface below said window; and
a second platform contactingly supported by said horizontal connection rail for holding said outdoor unit at a window sill of said window, wherein said first platform is configured to move between a first position adjacent said first track end of said at least one vertical guide track and a second position adjacent said second track end of said at least one vertical guide track, wherein said first position is a loading position in which said first platform is configured to enable said outdoor unit to be moved from said second platform to said first platform at a same height as said window sill of said window, and said second position is an installed position in which said first platform is configured to enable said outdoor unit to be arranged in a lower position so as to not block said window.

15. The adjustable mounting assembly of claim 14, wherein a quantity of said plurality of sliding elements is smaller than a quantity of said plurality of vertical guide tracks.

16. The adjustable mounting assembly of claim 14, wherein each of said plurality of sliding elements has a different constant force to accommodate a weight distribution of said outdoor unit and said first platform.

17. The adjustable mounting assembly of claim 14, wherein said frame further comprises a plurality of cross members between said plurality of vertical guide tracks on a same side.

18. An adjustable mounting assembly for an outdoor unit of an air conditioning unit, comprising:
- a frame having a vertical guide track with a first track end and a second track end; and
- a sliding element slidable within said vertical guide track between a first position at said first track end and a second position at said second track end, wherein said sliding element is configured to support said outdoor unit, and said sliding element is configured to move said outdoor unit to a plurality of height positions by sliding within said vertical guide track between said first track end and said second track end;
- wherein said sliding element includes a spring housing containing a spring coil with a first spring end and a second spring end, wherein said first spring end is coupled to said first track end of said vertical guide track and said second spring end is arranged within said spring housing, so that said spring coil is configured to lead said sliding element to slide within said vertical guide track between said first track end and said second track end; and
- wherein said spring coil has a constant force value predetermined to be equal to a first weight, and wherein said constant force value of said spring coil is adjustable by changing an initial amount of compression to accommodate a second weight different from said first weight.

\* \* \* \* \*